(12) United States Patent
Mubarek

(10) Patent No.: US 11,468,768 B2
(45) Date of Patent: Oct. 11, 2022

(54) METHOD, APPARATUS, AND SYSTEM FOR AUTOMATIC ROAD CLOSURE DETECTION DURING PROBE ANOMALY

(71) Applicant: HERE Global B.V., Eindhoven (NL)

(72) Inventor: Omer Mubarek, Chicago, IL (US)

(73) Assignee: HERE Global B.V., Eindhoven (NL)

(*) Notice: Subject to any disclaimer, the term of this patent is extended or adjusted under 35 U.S.C. 154(b) by 221 days.

(21) Appl. No.: 16/687,270

(22) Filed: Nov. 18, 2019

(65) Prior Publication Data

US 2021/0150893 A1 May 20, 2021

(51) Int. Cl.
*G08G 1/01* (2006.01)
*G01C 21/32* (2006.01)
*G06F 16/29* (2019.01)

(52) U.S. Cl.
CPC ........... *G08G 1/0129* (2013.01); *G01C 21/32* (2013.01); *G08G 1/0112* (2013.01); *G08G 1/0133* (2013.01); *G08G 1/0141* (2013.01); *G06F 16/29* (2019.01)

(58) Field of Classification Search
CPC .. G08G 1/0141; G08G 1/0133; G08G 1/0112; G08G 1/0129; G08G 1/123; G08G 1/22; G01C 21/32
See application file for complete search history.

(56) References Cited

U.S. PATENT DOCUMENTS

| | | | |
|---|---|---|---|
| 7,912,628 B2* | 3/2011 | Chapman | G01C 21/3691 701/117 |
| 8,731,808 B2* | 5/2014 | Tashiro | G08G 1/00 701/414 |
| 9,103,671 B1* | 8/2015 | Breed | G01S 17/931 |
| 9,286,793 B2* | 3/2016 | Pan | G08G 1/0129 |
| 9,437,107 B2* | 9/2016 | Scofield | G08G 1/096844 |
| 9,582,999 B2* | 2/2017 | Lewis | G08G 1/0112 |
| 9,696,169 B2* | 7/2017 | Johnson | G01C 21/3461 |
| 9,818,295 B2* | 11/2017 | Kesting | G08G 1/0112 |

(Continued)

OTHER PUBLICATIONS

Davide Pietrobon et al: "An Algorithm for Road Closure Detection from Vehicle Probe Data", ACM Transactions on Spatial Algorithms and Systems, ACM, 2 Penn Plaza, Suite 701 New York NY 10121-0701 USA, vol. 5, No. 2, Jul. 25, 2019 (Jul. 25, 2019), pp. 1-13, XP058439520, ISSN: 2374-0353, DOI: 10.1145/3325912.*

(Continued)

*Primary Examiner* — Luis A Martinez Borrero
(74) *Attorney, Agent, or Firm* — Ditthavong, Steiner & Mlotkowski

(57) ABSTRACT

An approach is provided for automatically detecting a road closure during a probe anomaly. The approach, for example, involves determining a drop in an expected vehicle volume in a geographic area over a time epoch, wherein the expected vehicle volume represents an expected number of unique vehicles traveling in the geographic area over the time epoch. The approach also involves computing an adjusted expected vehicle volume for a road segment in the geographic area based on the drop and a historical expected vehicle volume for the road segment over the time epoch. The approach further involves determining a time window comprising at least the time epoch. The approach further involves performing an automatic road closure detection on the road segment using the time window.

19 Claims, 14 Drawing Sheets

(56) References Cited

U.S. PATENT DOCUMENTS

| | | | |
|---|---|---|---|
| 9,881,384 B2* | 1/2018 | Ponder | G06V 20/182 |
| 9,959,756 B2* | 5/2018 | Filley | G08G 1/096741 |
| 9,996,798 B2* | 6/2018 | Pan | G08G 1/00 |
| 10,037,689 B2* | 7/2018 | Taylor | G05D 1/0285 |
| 10,497,256 B1* | 12/2019 | Mubarek | G01C 21/3841 |
| 10,818,165 B2* | 10/2020 | Zhang | G08G 1/09623 |
| 10,847,029 B2* | 11/2020 | Mubarek | G06F 16/29 |
| 11,222,531 B2* | 1/2022 | Mubarek | G08G 1/012 |
| 11,270,578 B2* | 3/2022 | Pietrobon | G06F 16/9537 |
| 2008/0046134 A1* | 2/2008 | Bruce | G01C 21/005 701/1 |
| 2008/0046165 A1 | 2/2008 | Downs et al. | |
| 2009/0140887 A1* | 6/2009 | Breed | G01S 13/865 701/116 |
| 2014/0114556 A1* | 4/2014 | Pan | G08G 1/0112 701/119 |
| 2014/0222321 A1* | 8/2014 | Petty | G08G 1/012 701/533 |
| 2015/0073689 A1* | 3/2015 | Hampapur | G08G 1/0145 701/118 |
| 2015/0120174 A1* | 4/2015 | Lewis | G08G 1/0129 701/118 |
| 2016/0027299 A1* | 1/2016 | Raamot | G08G 1/0112 340/917 |
| 2016/0078758 A1* | 3/2016 | Basalamah | H04W 4/80 701/118 |
| 2016/0171278 A1* | 6/2016 | Ponder | G06V 20/182 382/104 |
| 2016/0189044 A1* | 6/2016 | Pan | G08G 1/0129 706/58 |
| 2016/0247397 A1* | 8/2016 | Xu | G08G 1/0133 |
| 2016/0275787 A1* | 9/2016 | Kesting | G01C 21/32 |
| 2016/0284212 A1* | 9/2016 | Tatourian | G08G 1/096775 |
| 2017/0061787 A1 | 3/2017 | Lorkowski et al. | |
| 2017/0098373 A1* | 4/2017 | Filley | H04W 4/90 |
| 2017/0177933 A1 | 6/2017 | Mittal et al. | |
| 2018/0209797 A1 | 7/2018 | Kesting et al. | |
| 2018/0336780 A1* | 11/2018 | Ran | G08G 1/0145 |
| 2018/0376305 A1* | 12/2018 | Ramalho de Oliveira | H04W 4/44 |
| 2018/0376306 A1* | 12/2018 | Ramalho de Oliveira | H04W 88/10 |
| 2019/0114909 A1* | 4/2019 | Halama | G08G 1/096775 |
| 2019/0122544 A1* | 4/2019 | Schlesinger | G08G 1/0133 |
| 2019/0325235 A1* | 10/2019 | Stenneth | G08G 1/0112 |
| 2019/0325237 A1* | 10/2019 | Zhang | G06K 9/6267 |
| 2019/0325349 A1* | 10/2019 | Zhang | G06N 5/046 |
| 2019/0325736 A1* | 10/2019 | Zhang | G08G 1/0112 |
| 2020/0090503 A1* | 3/2020 | Rolf | G08G 1/0116 |
| 2020/0105134 A1* | 4/2020 | Pietrobon | G08G 1/012 |
| 2020/0111349 A1* | 4/2020 | Mubarek | G08G 1/052 |
| 2020/0111357 A1* | 4/2020 | Mubarek | G08G 1/096766 |
| 2020/0158530 A1* | 5/2020 | Xu | G08G 1/0969 |
| 2020/0273328 A1* | 8/2020 | Mubarek | G01C 21/3492 |
| 2020/0334979 A1* | 10/2020 | Gonçalves | G08G 1/0129 |
| 2020/0402394 A1* | 12/2020 | Smith | G08G 1/0129 |
| 2021/0019376 A1* | 1/2021 | Neubauer | G08G 1/081 |
| 2021/0020038 A1* | 1/2021 | Weldemariam | G08G 1/0112 |
| 2021/0095975 A1* | 4/2021 | Mubarek | G08G 1/096775 |
| 2021/0134149 A1* | 5/2021 | Mubarek | H04W 4/44 |
| 2021/0142668 A1* | 5/2021 | Mubarek | G08G 1/0141 |
| 2021/0150894 A1* | 5/2021 | Mubarek | G08G 1/0129 |
| 2021/0201672 A1* | 7/2021 | Gao | G08G 1/0145 |
| 2021/0241614 A1* | 8/2021 | Mubarek | G08G 1/096838 |
| 2021/0256838 A1* | 8/2021 | Mubarek | G08G 1/052 |

OTHER PUBLICATIONS

Pietrobon et al, "An Algorithm for Road Closure Detection from Vehicle Probe Data", ACM Transactions on Spatial Algorithms and Systems, ACM, 2 Penn Plaza, Suite 701 New York NY 10121-0701 USA, vol. 5, No. 2, Jul. 25, 2019 (Jul. 25, 2019), pp. 1-13, XP058439520, ISSN: 2374-0353, DOI: 10.1145/3325912.*

Office Action for related European Patent Application No. 20208026. 3-1203, dated Apr. 12, 2021, 12 pages.

Pietrobon et al., "An Algorithm for Road Closure Detection from Vehicle Probe Data", PublicationACM Transactions on Spatial Algorithms and Systems, Article No. 12, Jul. 2019, 13 pages.

* cited by examiner

FIG. 2A

| $e_0$ | $e_1$ | $e_2$ | $e_3$ | $e_4$ | $e_5$ | $e_6$ | $e_7$ | $e_8$ | $e_9$ |
|---|---|---|---|---|---|---|---|---|---|
| 0 | 1 | 1 | 2 | 1 | 3 | 2 | 1 | 1 | 0 |
| 3 | 3 | 2 | 2.5 | 5 | 4 | 2 | 1 | 0 | 0 |

| $e_0$ | $e_1$ | $e_2$ | $e_3$ | $e_4$ | $e_5$ | $e_6$ | $e_7$ | $e_8$ | $e_9$ |
|---|---|---|---|---|---|---|---|---|---|
| 0 | 1 | 1 | 2 | 1 | 3 | 2 | 1 | 1 | 0 |
| 3 | 3 | 2 | 2.5 | 5 | 4 | 2 | 1 | 0 | 0 |

METHOD, APPARATUS, AND SYSTEM FOR AUTOMATIC ROAD CLOSURE DETECTION DURING PROBE ANOMALY

BACKGROUND

Traffic and mapping service providers often use global position satellite (GPS) or equivalent probe data (e.g., time-stamped locations of probe vehicles traveling in a road network) to automatically infer traffic information (e.g., road closures). For example, these providers may employ an architecture, where external third-party providers send probe data to the providers. The providers then process the probe data and make traffic-based decisions (e.g., issuing traffic alerts, rerouting traffic, dispatching maintenance crews, etc.) based on the received probe data. Hence, service providers depend on accurate probe data and consistent probe volume. If there is a probe anomaly (e.g., unexpected changes to volume, quality, etc. of the received probe data) and the providers are not aware of the change, then the decisions made by the providers may lead to incorrect conclusions or actions. Accordingly, service providers face significant technical challenges to automatically infer reliable traffic information (e.g., road closures) during probe anomalies.

Some Example Embodiments

Therefore, there is a need for an approach for automatically inferring reliable traffic information (e.g., road closures) during a significant change or drop in real-time probe volume.

According to one embodiment, a method comprises determining a drop in an expected vehicle volume in a geographic area over a time epoch, wherein the expected vehicle volume represents an expected number of unique vehicles traveling in the geographic area over the time epoch. The method also comprises computing an adjusted expected vehicle volume for a road segment in the geographic area based on the drop and a historical expected vehicle volume for the road segment over the time epoch. The method further comprises determining a time window comprising at least the time epoch. The method further comprises performing an automatic road closure detection on the road segment using the time window.

According to another embodiment, an apparatus comprises at least one processor, and at least one memory including computer program code for one or more computer programs, the at least one memory and the computer program code configured to, with the at least one processor, cause, at least in part, the apparatus to determine a drop in an expected vehicle volume in a geographic area over a time epoch, wherein the expected vehicle volume represents an expected number of unique vehicles traveling in the geographic area over the time epoch. The apparatus is also caused to compute an adjusted expected vehicle volume for a road segment in the geographic area based on the drop and a historical expected vehicle volume for the road segment over the time epoch. The apparatus is further caused to determine a time window comprising at least the time epoch. The apparatus is further caused to perform an automatic road closure detection on the road segment using the time window.

According to another embodiment, a non-transitory computer-readable storage medium carries one or more sequences of one or more instructions which, when executed by one or more processors, cause, at least in part, an apparatus to determine a drop in an expected vehicle volume in a geographic area over a time epoch, wherein the expected vehicle volume represents an expected number of unique vehicles generating probe data while traveling in the geographic area over the time epoch. The apparatus is also caused to compute an adjusted expected vehicle volume for a road segment in the geographic area based on the drop and a historical expected vehicle volume for the road segment over the time epoch. The apparatus is further caused to determine a time window based on the probe data comprising at least the time epoch. The apparatus is further caused to perform an automatic road closure detection on the road segment using the time window.

According to another embodiment, an apparatus comprises means for determining a drop in an expected vehicle volume in a geographic area over a time epoch, wherein the expected vehicle volume represents an expected number of unique vehicles traveling in the geographic area over the time epoch. The apparatus also comprises means for computing an adjusted expected vehicle volume for a road segment in the geographic area based on the drop and a historical expected vehicle volume for the road segment over the time epoch. The apparatus further comprises means for determining a time window comprising at least the time epoch. The apparatus also comprises means for performing an automatic road closure detection on the road segment using the time window.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 2A-2F are diagrams illustrating an example sliding dynamic window used for automatic closure detection (ACD), according to one embodiment;

DESCRIPTION OF SOME EMBODIMENTS

Examples of a method, apparatus, and computer program for automatically detecting road closures during probe anomaly are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
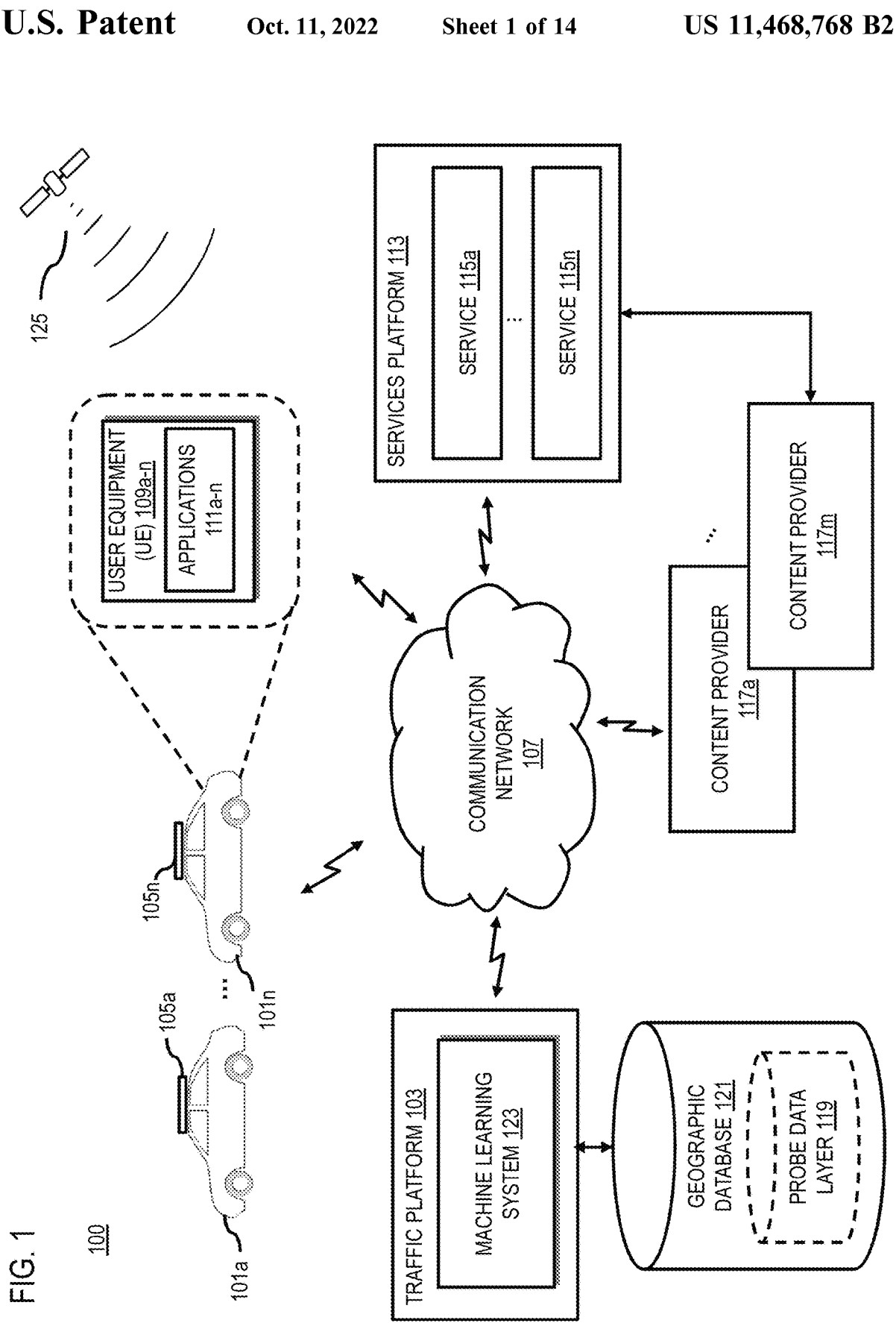
FIG. 1 is a diagram of a system capable of automatically detecting a road closure during a probe anomaly, according to one embodiment.

FIG. 1 is a diagram of a system capable of automatically detecting road closures during a probe anomaly, according to one embodiment. As mentioned above, traffic and mapping service providers often use GPS or equivalent probe data (e.g., time-stamped locations of probe vehicles traveling in a road network) to automatically infer traffic information (e.g., road closures). For example, the service providers may employ an architecture, where external third-party providers send probe data to the service providers. The service providers then process the probe data and make traffic-based decisions (e.g., issuing traffic alerts, rerouting traffic, dispatching maintenance crews, etc.) based on the received probe data. Hence, traffic and mapping service providers depend on accurate probe data and consistent probe volume. If there is a probe anomaly (e.g., unexpected changes to volume, quality, etc. of the received probe data) and the service providers are not aware of this occurrence, then the traffic-based decisions made by the providers may lead to incorrect conclusions or actions.

While most traffic anomalies can have at least some negative impact on traffic, road closures can be the most severe because vehicles are unable to travel through the affected road segment. In addition, the lack of knowledge, particularly real-time knowledge, about a road closure can have an enormous negative impact on a user's trip planning, routing, and/or estimated time of arrival. In this instance, closure refers to restricting traffic flow on a road segment such that no vehicle or a reduced number of vehicles (e.g., reduced with respect to an average free flow traffic volume on the road segment) are permitted or able to travel on the road segment.

In the presence of GPS probe anomalies over a large monitored region (e.g., a country, a city, etc.), specifically significant drops in probe volumes, automatic detection systems must adjust to such drops. In one instance, a probe anomaly is an unexpected drop in GPS probe volume at any stage before a service provider makes an inference based on the probe data. A probe anomaly can happen due to one or more reasons such as:

One or more external probe suppliers experience lower throughout;

One or more external probe suppliers experience an outage such that they are not sending any probe data to service providers;

The system which consumes probes is malfunctioning and is dropping probe data sent to it; and While all components of the system are working as designed, probe volume is low due to natural reasons such as where and when users drive less (e.g., during holidays).

One way of working for traffic systems is to construct expected probe volumes based on historical data over a time period. Then, when the system is monitoring live probes (e.g., real-time probe data), it calculates actual volumes and compares them to the expected volumes. If the actual volumes differ from the expected volumes, then the system outputs an inference based on this difference. However, if the difference between the expected and actual volumes is due to a probe anomaly, then the traffic-based inferences derived therefrom will be incorrect. For example, if the measured real-time volume (actual volume) is observed to be slightly less than the expected volume, then the likelihood that the systems will flag the road as potential closure increases. Further, if there is a very significant drop (e.g., 90%), then the systems might falsely flag most of the roads in the affected area. In such cases, users of a traffic service that rely on problematic data can suffer from unexpected delays, unnecessary reroutes, etc. Consequently, users may gradually lose their trust in the service if such events occur frequently. Accordingly, mapping service provides face significant technical challenges to automatically infer reliable traffic information (e.g., road closures) during probe anomalies.

To address these problems, the system 100 of FIG. 1 introduces a capability to automatically detect road closures using probe data during a significant drop in probe volume across a large monitored region (e.g., a country, a city, etc.). In one embodiment, the system 100 collects probe data from one or more vehicles 101a-101n (also collectively referred to as vehicles 101) (e.g., standard vehicles, autonomous vehicles, heavily assisted driving (HAD) vehicles, semi-autonomous vehicles, etc.) that inform the automatic closure detection (ACD) with dynamic window algorithm (e.g., the traffic platform 103). In one instance, the vehicles 101 include one or more vehicle sensors 105a-105n (also collectively referred to as vehicles sensors 105) (e.g., global positioning system (GPS) sensors) and have connectivity to the traffic platform 103 via the communication network 107. In one embodiment, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time.

In one embodiment, the system 100 can also collect probe data from one or more user equipment (UE) 109a-109n (also collectively referenced to herein as UEs 109) associated with the a vehicle 101 (e.g., an embedded navigation system), a user or a passenger of a vehicle 101 (e.g., a mobile device, a smartphone, a client terminal, etc.), or a combination thereof. In one instance, the UEs 109 may include one or more applications 111a-111n (also collectively referred to herein as applications 111) (e.g., a navigation or mapping application). In one embodiment, the system 100 may also collect the probe data from one or more other sources such as government/municipality agencies, local or community agencies (e.g., police departments), and/or third-party official/semi-official sources (e.g., a services platform 113, one or more services 115a-115n, one or more content providers 117a-117m, etc.). In one instance, the probe data collected by the vehicle sensors 105, the UEs 109, one or more other sources, or a combination thereof may be stored in the probe data layer 119 of the geographic database 121, the geographic database 121, or a combination thereof.

In one embodiment, the system 100 makes a distinction between probe volume and unique vehicle volume in the probe data. In one instance, a probe device (e.g., a vehicle 101) sends probes periodically to the traffic platform 103 via the communication network 107. The probe transmission frequency typically depends on the configuration imposed by the probe provider (e.g., a service 115, a content provider 117, etc.). Therefore, on the same road segment, within the same time period, two distinct or unique probe devices (e.g., vehicles 101) can have very different probe counts from each other. An example of this difference is illustrated in the following scenario with two vehicles 101 acting as probe devices:

Vehicle 101a—transmits probes with a frequency of 1 probe per 1 second; and

Vehicle 101b—transmits probes with a frequency of 1 probe per 15 seconds.

In this example, the system 100 detects in a one-minute period 60 probes from Vehicle 101a and 4 probes from Vehicle 101b. Yet, there are only two vehicles 101 (e.g., vehicles 101a and 101b). In other words, in some cases (e.g., when probe devices are transmitting probes at different frequencies), the total probe volume is not representative of unique vehicle volume. Furthermore, if there is a probe anomaly, the anomaly affects all the probes of a vehicle (e.g., vehicle sensors 105). In other words, if a probe provider (e.g., a service 115) is experiencing a probe data outage, none of the probes 105 of the affected vehicles 101 will reach the system 100. Similarly, if there is a holiday, the count of the vehicles 101 on the road network will likely be reduced. Accordingly, in one embodiment, the system 100 uses the volume of unique vehicles 101 in a monitored area to detect probe anomalies and not the probe volume directly. In other embodiments, the system 100 can use probe volume (e.g., when probe transmission frequencies are relatively uniform across probe devices). It is also noted that although the various embodiments described herein are discussed with respect to unique vehicle volumes, it is contemplated that the embodiments are also applicable to probe volumes that are represented as the number of individual probe points received.

In one embodiment, the system 100 monitors probe data road segments within a large monitored area (e.g., a country, a city, etc.) and generates a set of features (e.g., for training the machine learning system 123) which indicate an anomaly with the monitored road. In one instance, the features include, but are not limited to, historically expected vehicle volumes as well as real-time actual observed vehicle volumes on road segments. In one embodiment, the features are calculated every epoch (e.g., each 5-minute period, each hour, etc.). However, making traffic-based decisions based on the most recent epoch's features is risky because sudden fluctuations in actual volumes could throw the accuracy of such decisions. Therefore, in one embodiment, the system 100 also considers the same set of features over a past time window (e.g., over the previous hour, previous 5 hours, etc.). It is contemplated that the time window enables the system 100 to smooth out such fluctuations over time.

In one embodiment, the system 100 increases the length of the time window such that a large enough volume of vehicles 101 can reasonably be expected to travel on the given road segment. Then, if the system 100 determines that the actual volume is low, the system 100 can flag the difference (e.g., above a given threshold level of certainty) between the expected and actual vehicle volumes as a sign of road closure. In other words, the system 100 adjusts the time window to look at a large enough time period such that the difference between expected and actual vehicle volumes can be highlighted in case of a reduced actual volume (e.g., a probe anomaly). For example, a busy road segment could have a window spanning 15 minutes, whereas a less busy road could have a window spanning over 10 hours to reach the same total expected volume as that of the busy road segment. Hence, the time window is this instance is dynamic.

By way of example, if the system 100 expects 0.02 vehicles at a given epoch, and the system 100 determines that the actual volume is 0 vehicles, then it is difficult for the system 100 to conclude a closure above a given threshold level of certainty. For example, the fact that no vehicles passed through the road segment could equally be the result of a road closure or due to the regular volume of the road.

However, if the system adjusts the time window to look at a large enough time period such that 10 vehicles are expected rather than 0.02, then when the system 100 determines that the actual volume is 0 vehicles, the system 100 can conclude (e.g., above the given threshold level of certainty) that the difference in volume is indicative of a road closure.

In one embodiment, once the system 100 determines the window size (applicable time period), the system 100 calculates the same features it did for the current epoch. For instance, if two of the features for the current epoch are expected vehicle volume and actual vehicle volume, the system 100 calculates the total expected vehicle volume and the total actual vehicle volume observed over the entire window, however long the system 100 determined the dynamic window.

In one embodiment, the dynamic time window is a variable size, sliding window over n-minute epochs which satisfies the following conditions:
 1. The total expected vehicle volume of all the epochs that the dynamic window spans across must be greater than or equal to a threshold volume called EXPECTED_THRESH;
 2. The dynamic window shall have a minimum size, called MIN WINDOW SIZE; and
 3. The dynamic window shall have a maximum size, called MAX WINDOW SIZE.

In one embodiment, the system 100 assumes that at epoch i, the dynamic time window spans across N epochs (e.g., from epoch (i−N) to epoch i−1. In the next epoch (epoch (i+1)), the system 100 calculates new current-epoch features. At the same time, the system 100 adds epoch I as the most recent epoch of the dynamic window, spanning over N+1 epochs. In one instance, depending on the expected volume of epoch I, the dynamic time window may not need one or more of the oldest epochs in the window while still satisfying requirements 1 and 2 above. Therefore, after sliding one epoch and adding a new epoch, the system 100 can clean or remove the oldest epochs from consideration while still satisfying the dynamic window requirements above.

Figures 2C, 2D:
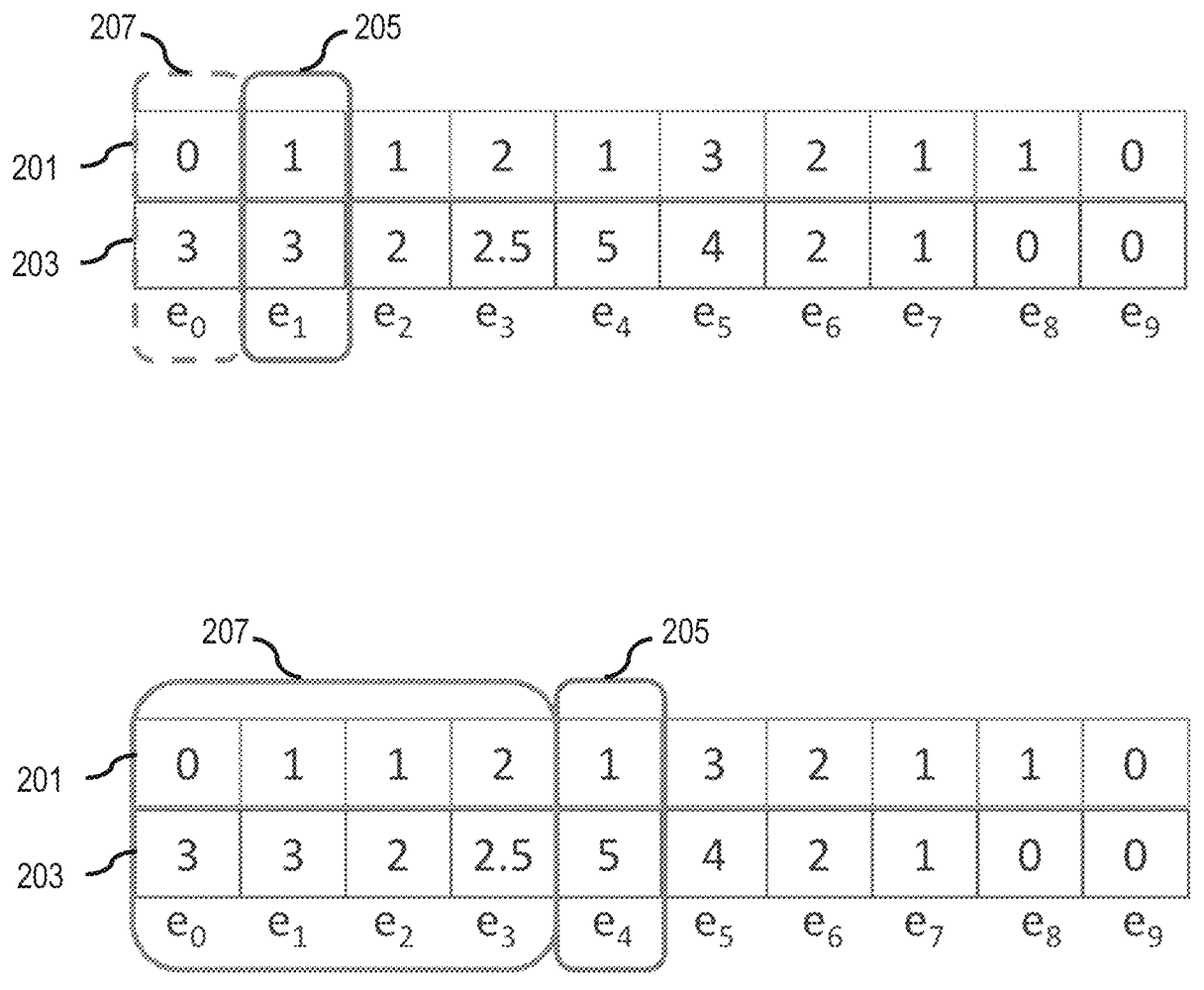
Figures 2E, 2F:
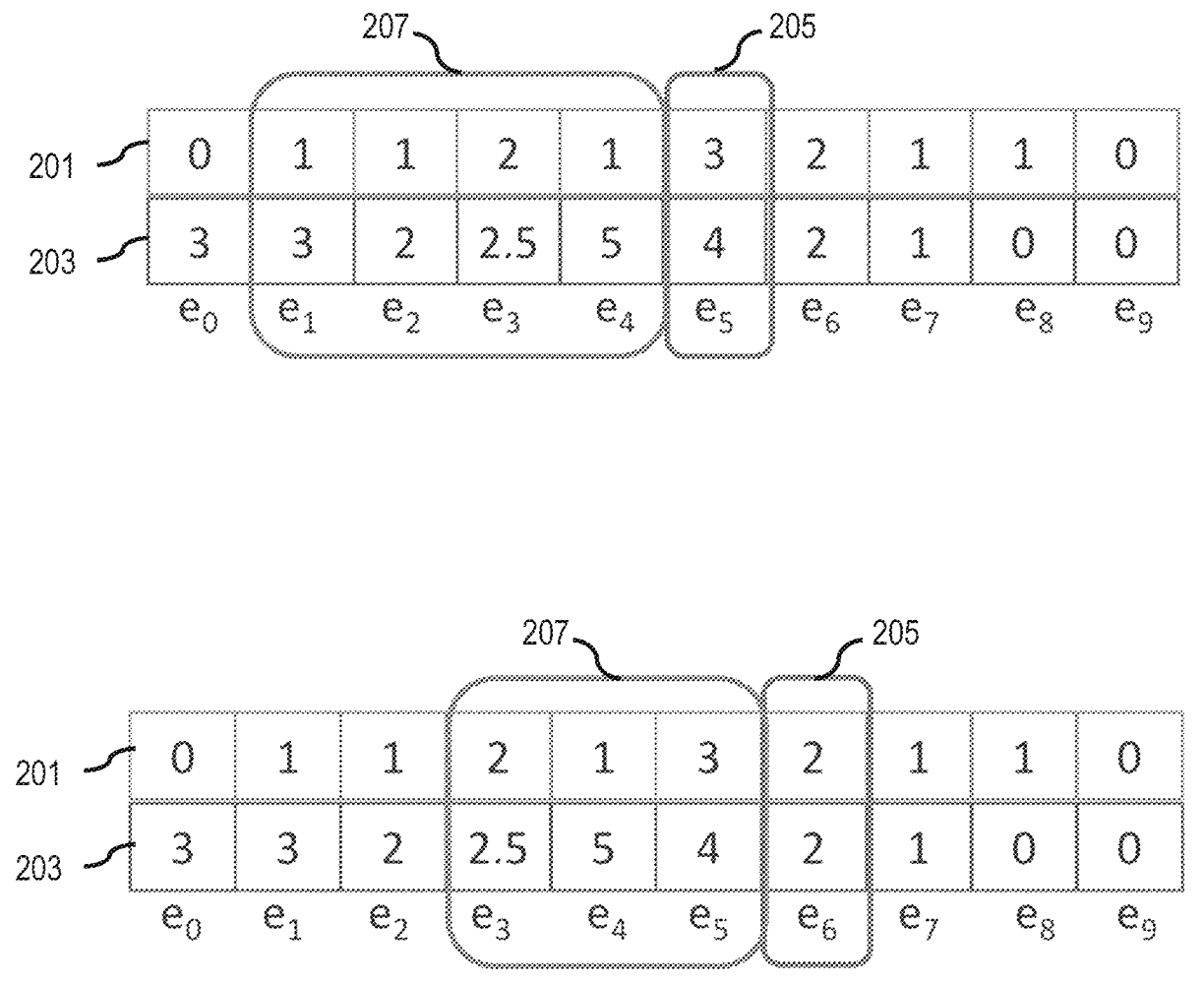

FIGS. 2A-2F are diagrams illustrating an example sliding dynamic window used for automatic closure detection (ACD), according to one embodiment. Referring to FIG. 2A, two example time series are depicted; one row (201) represents the actual vehicle volume on a given road segment and the other row (203) represents the expected vehicle volume on that road segment derived from historical data (e.g., stored in or accessible via the probe data layer 119 and/or the geographic database 121). In this instance, the two series cover epoch-0 (e0) to epoch-9 (e9). It is also noted that although the various diagrams are illustrated with the actual vehicle volumes represented above the expected vehicle volumes, it is contemplated that the order of the two time series does not affect the operation of the dynamic time window as described herein.

In one embodiment, the system 100 only analyzes the current-epoch data (denoted by the rectangle 205), as depicted in FIG. 2B (Epoch-0). In one instance, when the current epoch 205 moves to e1 (FIG. 2C) (e.g., after the passage of 5 minutes, 1 hour, etc.), the system 100 stores the time series data for the previous epoch (e0) in the dynamic window (denoted by the rectangle 207). In one embodiment, the system 100 then checks whether the total expected (historic) volume in the dynamic window 207 is greater than the EXPECTED_THRESH, which is 10 in this example. At e1, the sum is 3 and, therefore, less than 10. As such, the dynamic window 207 is inactive as represented by the dashed lines of the rectangle 207 and the system 100 does not calculate any features (e.g., for training the machine learning system 123). It is contemplated that while the EXPECTED_THRESH value in this instance is 10, the system 100 can use any figure representative of the number of expected vehicles during the window that will enable to the system 100 to conclude (e.g., above a given threshold of certainty) a road closure based on the actual observed value.

In this example, when the current epoch 205 moves to e4 (FIG. 2D), the system 100 can determine that the dynamic window 207 now includes values e0, e1, e2, and e3 with a total expected vehicle count of 10.5 (e.g., 3+3+2+2.5=10.5). Thus, when the system 100 subsequently checks whether the total expected (historic) volume in the dynamic window 207 is greater than EXPECTED_THRESH (e.g., 10), it determines that the total in the window 207 satisfies the requirement of greater than or equal to EXPECTED_THRESH. Consequently, in one embodiment, the system 100 activates the dynamic window 207 as represented by the change from a dashed line to a solid line. However, before calculating the features, in one embodiment, the system 100 checks if one or more older epochs can be removed from the window 207 while maintaining a total expected vehicle count greater than EXPECTED_THRESH (e.g., 10). In one instance, the first candidate is the oldest epoch of the window (e.g., e0). In this example, removing e0 will reduce the total below the EXPECTED_THESH (e.g., 10.5−3=7.5). Therefore, at e4, the system 100 does not remove any epochs from the window 207 and calculates the features as described below.

In one embodiment, once the system 100 activates the dynamic window 207, the time window 207 remains active. In contrast to when e4 was the current epoch (FIG. 2D), at e5 (FIG. 2E), the system 100 determines that the oldest epoch of the window (e.g., e0) can now be removed from within the window 207 while still satisfying the dynamic window requirements. For example, even after the system 100 removes e0, the total expected volume of the window 207 is 12.5 (e.g., 3+2+2.5+5=12.5), which is greater than EXPECTED_THRESH (e.g., 10). In this example, at e5, the window 207 spans 4 epochs (e1-e4) whereas at e6 (FIG. 2F), the window 207 only spans 3 epochs (e3-e5). Hence, the window 207 is dynamic.

In one embodiment, the system 100 modifies the process described with respect to FIG. 2A-2F such that the system 100 can still provide reliable road closure detections during a significant drop in real-time probe volume. Specifically, the system 100 adjusts the above-described process based on or more fluctuations in the magnitude of the volume drop. As detailed above, the width of the dynamic window 207 is determined by the system 100 based on the expected vehicle count on a road segment such that the total expected volume over all epochs within the window 207 is equal to or greater than EXPECTED_THRESH (e.g., 10). In other words, removing the oldest epoch(s) from the window 207 would bring the total expected volume to less than EXPECTED_THRESH. It is contemplated that this functionality assumes that there are no abnormalities in the transmission or receipt probe volume.

In one embodiment, when the system 100 detects a probe anomaly, the system 100 modifies the expected volume for each epoch since the detection of the anomaly prior to the application and calculation of the sliding dynamic window as described above and then follows the steps described above with respect to the dynamic time window 207. This way, the dynamic window is also adjusted to expect the sum of adjusted epoch volumes. For example, if the anomaly corresponds to a volume drop of 30%, then the system 100 will reduce all expected volumes by the same 30% rate. This results in wider windows to accommodate the reduced real-time vehicle volume.

In one instance, the system 100 adjusts the expected volumes for the dynamic window depending on over how many epochs the probe anomaly is detected. The simplest case is where the system 100 detects the probe anomaly immediately over the most recent epoch. In this instance, the system 100 measures the actual volume every epoch and compares the values to the expected volume of that epoch to determine whether there is a probe anomaly. If the system 100 detects a probe anomaly, it is contemplated that the anomaly affects data only in the current/most recent epoch. In other words, data in the dynamic window, which spans multiple epochs before the current epoch, is not corrupt. In one embodiment, when the system 100 calculates the machine learning features (e.g., for the machine learning system 123), the system 100 reduces the expected volume for the current epoch by the anomaly rate. For instance, if the system 100 detects a drop of 50% in vehicle volume, then the system 100 will lower the expected volume of the current epoch by 50% as well. In the next epoch, the previous "current epoch" is pushed into the dynamic window, with its adjusted expected volume (50% of actual expected volume).

Figure 3:
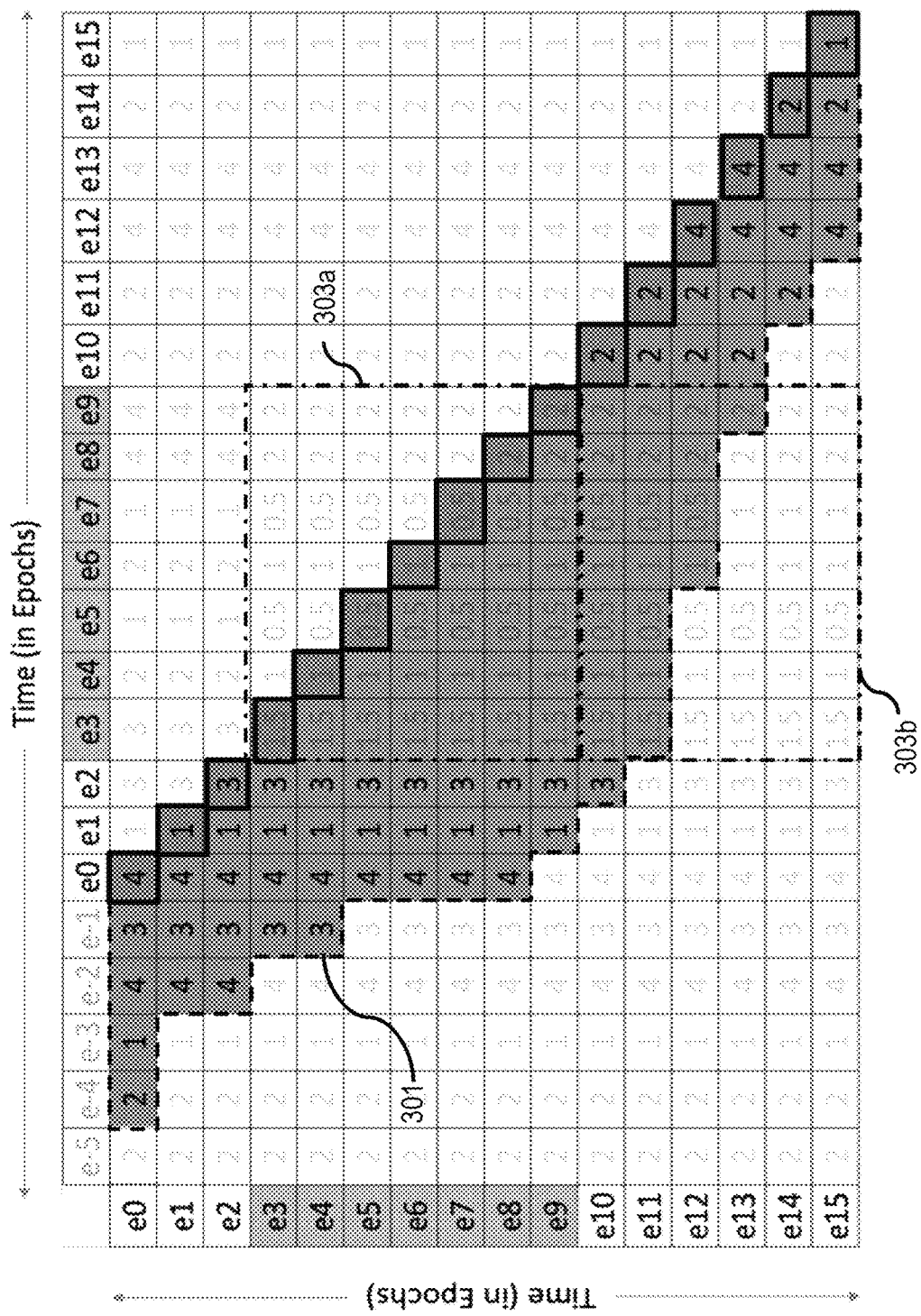
FIG. 3 is a diagram illustrating adjusted expected volumes based on a probe anomaly detected immediately over the most recent epoch, according to one embodiment.

FIG. 3 is a diagram illustrating adjusted expected volumes based on a probe anomaly detected immediately over the most recent epoch, according to one embodiment. In this example, the system 100 has already determined that the EXPECTED_THRESH is 10. In other words, the dynamic window generated by the system 100 spans over epochs whose total expected volume is equal to or just above 10. In this instance, FIG. 3 corresponds to one specific road segment and its expected volumes for each epoch. For instance, if an epoch is 5-minutes long, then the road segment will have 288 such expected epochs in one day (e.g., (24 hours×60 minutes per hour)/by 5 minutes)=288 epochs). Further, both axis of FIG. 3 are time axes measured in epochs (e.g., 5-minute epochs).

In one embodiment, the horizontal axis indicates the current epoch (e.g., depicted within black boxes) (e.g., at e0:e0, e1:e1, e2:e2, etc.) and epochs covered by the dynamic window (cells having a shaded background between the current epochs and the dashed line 301) (e.g., e0:e-4 to e-1; e1:e-2 to e0; e2:e-2 to e1, etc.). In this example, FIG. 3 starts with the current epoch=e0 (first row), with the dynamic window spanning left to right from e-4 through e-1 since the total expected volume is equal to the EXPECTED_THRESH (e.g., 10).

In one instance, the vertical axis depicts each observation as time increases from epoch 0 (e0) to epoch 15 (e15). For example, when time advances from e0 to e1 (row 2), the current epoch changes from e0:e0 to e1:e1 (hence e1:e1 is depicted within a black box). Further, the system 100 can determine (e.g., based on data stored in or accessible via the probe data layer 119 and/or the geographic database 121) that the expected value of the current epoch e1 is 1 and not 4 (e0:e0). In one embodiment, as time advances from e0 to e1, the system 100 pushes the previous "current epoch" into the dynamic window so that the total expected volume is equal to or just greater than the EXPECTED_THRESH (e.g., e1:e-2 to e0). It is contemplated that depending on the value of the current epoch, the system 100 can expand or contract the time window according to the time advancement while always maintaining the total expected value just greater than or equal to the determined EXPECTED_THRESH value (e.g., 10). As such, it is contemplated that the time window is dynamic.

In one embodiment, the grey-colored values before the dynamic window (e.g., to the left of the dashed line) are old window values, no longer included within the dynamic window. In contrast, the grey-colored values after the current epoch (e.g., depicted to the right of the black box) are the expected volume values of the future epochs. As such, the future values first become current-epoch values and then dynamic window values as the vertical time axis advances from e0 to e15.

In one embodiment, the time at which the probe anomaly is detected by the system 100 may also be depicted. For example, in this instance the system 100 can determine that the probe anomaly is detected between e3 and e9. In this example, e3 through e9 on both the horizontal and vertical axis are shaded accordingly. In one instance, the system 100 adjusts the expected values during the probe anomaly as described above (e.g., a drop of 50% in vehicle volume=50% decrease in expected volume of current epoch), as depicted by the cells with grey values within the box 303a. For example, the system 100 can adjust the expected values as follows: e3:e3 (3→1.5); e4:e4 (2→1); e5:e5 (1→0.5), etc. In other words, in one embodiment, the system 100 adjusts the expected values during the probe anomaly (e3:e3 to e9:e9) (box 303a) in the current-epoch cells (black box), in the dynamic window cells (shaded cells between current epochs and the dashed line 301), and the cells within the boxes 303a and 303b outside the current/dynamic window cells (with no background color).

In this example, the system 100 determines that the dynamic window and the current epoch have the original expected volumes between e0 and e2. In other words, the system 100 does not detect a probe anomaly during that time. However, starting at e3, the system 100 detects a 50% drop in expected volumes (i.e., a probe volume anomaly). In one embodiment, the system 100 immediately adjusts the volume for the current epoch (e3:e3) by halving the expected volume (3→1.5), which is indicated by the lighter font of e3:e3 relative to epoch e2:e2. In one instance, when time advances to e4, the system 100 halves the new current epoch's (e4:e4) expected value (2→1) and the previous current epoch's (e3:e3) adjusted value (1.5) is pushed into the dynamic window (e.g., e4:e-1 to e3). In one embodiment, the system 100 continues this process until it reaches e10. At e10, the system 100 detects that the probe volume anomaly has expired and, therefore, stops adjusting the current epoch volumes, which is indicated by the darker font of epoch e10:10 relative to the epoch e9:e9.

In one embodiment, once the probe volume anomaly has expired (e.g., starting at e10), the system 100 no longer adjusts the current epoch values; however, once the system 100 adjusted the expected volume during a probe anomaly (e.g., halving the expected values as depicted in the box 303a), the system 100 maintains such values for each remaining epoch of the road network, as depicted by the adjusted values depicted within the box 303b. Thus, depending on the size of the dynamic window for each subsequent epoch, the dynamic window may contain a mixture of adjusted expected volumes (numbers with a light font) and original expected volumes (numbers with a dark font) (e.g., historic volumes). For example, at epoch 12, the system 100 adjusts the dynamic window (e12:e6 to e11) to include the adjusted values at e12:e6 (2→1), e12:e7 (1→0.5), e12:e8 (4→2), and e12:e9 (4→2) and the original values at e12:10 and e12:e11. In this example, the mixture of adjusted and original expected volume values starts at e4 and stops at e13. Specifically, at e14, the dynamic window (e14:e11 to e13) is already greater than or equal to the EXPECTED_THRESH (10). Thus, in one embodiment, at e14, the system 100 no longer includes any adjusted expected values (e.g., values within the boxes 303*a* or 303*b*).

Figure 4:
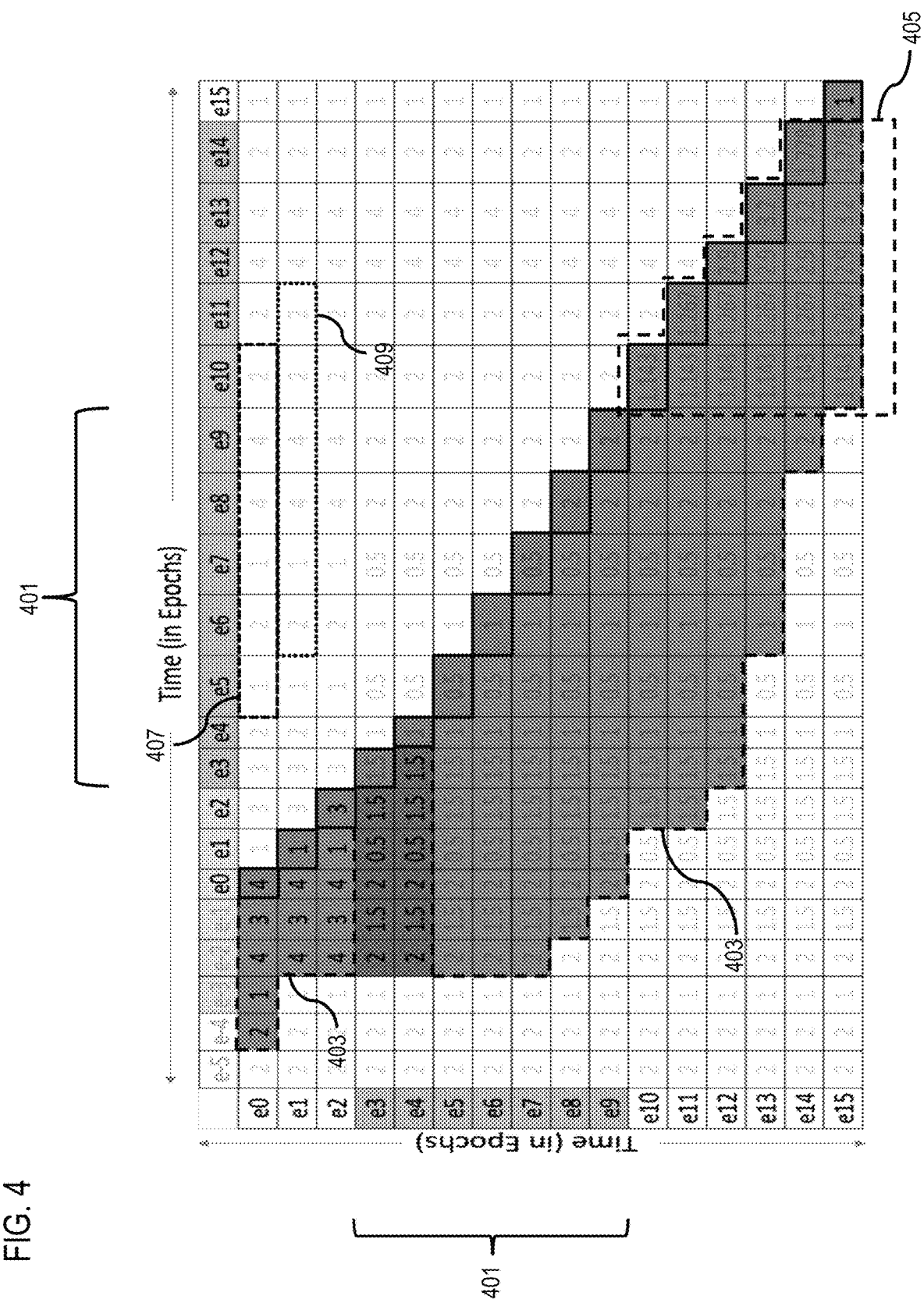
FIG. 4 is a diagram illustrated adjusted expected volumes based on a probe anomaly detected over a sliding window of epochs, according to one embodiment.

FIG. 4 is a diagram illustrating adjusted expected volumes based on a probe anomaly detected over a sliding window of epochs, according to one embodiment. Like FIG. 3, the horizontal axis of FIG. 4 indicates the current epoch (depicted by black boxes) (e.g., e0:e0, e1:e1, e2;e2, etc.) and the epochs covered by the dynamic window and the vertical axis shows each observation as time increases from epoch 0 (e0) to epoch 15 (e15). In one embodiment, the system 100 measures the probe anomaly over multiple epochs: the total expected volume over multiple epochs is compared against the total actual volume in real-time. In one instance, the main reason for using a window of multiple epochs to detect a probe anomaly is due to expected volume fluctuations from epoch to epoch. As such, the system 100 can use the window to smooth such fluctuations and thereby provide reliable road closure detections.

In one embodiment, when the system 100 detects that a probe anomaly 401 is happening (e.g., at epoch 3), the system 100 assumes that the anomaly has been occurring for the entire duration of the anomaly detection sliding window (e.g., 6 epochs). Therefore, when the system 100 detects an anomaly at the current epoch e3 (e.g., a 50% drop in observed vehicle volume), the system 100 not only adjusts the current epoch e3:e3 accordingly (3→1.5), but it also halves the expected volumes of the epochs e-2 through e3 (e.g., e3:e-2 (4→2), e3:e-1 (3→1.5), e3:e0 (4→2), e3:e1 (1→0.5), e3:e2 (3→1.5), and e3:e3 (3→1.5). In this example, the sliding window is 6 epochs; however, it is contemplated that the system 100 could determine a sliding window of any number of epochs that enabled the system 100 to smooth (e.g., until the variance is below a given threshold) the expected vehicle volume over a plurality of time epochs.

In one instance, the system 100 only keeps in memory (e.g., the probe data layer 119 and/or the geographic database 121) the data for the current epoch and the epochs contained in the dynamic window. As described above, in one embodiment, the system 100 defines the dynamic window based on the determination of whether or not the total expected volume within the window is greater than or equal to the EXPECTED_THRESH (e.g., 10 vehicles). Thus, in this example, at e0 prior to the probe anomaly, the system 100 would define the volumes for e0:e-4 to e0:e1 as being within the dynamic window and, therefore, stored in memory. In this example, the values that are within the dynamic window are depicted as being between the line 403 and the black box of each current epoch.

In contrast, when then system 100 adjusts the expected volumes in the sliding window due to the anomaly detection as described above (e3:e-2 to e:3), there is a chance that the new total adjusted expected volume will not satisfy the EXPECTED_THRESH requirement. For instance, in this example at e3, the system 100 would determine that the total adjusted expected volume within the time window e3:e-2 to e3 is only 7.5 vehicles and, therefore, does not satisfy the EXPECTED_THRESH requirement. Thus, the system 100 would not keep the corresponding values in memory. Similarly, the system 100 would determine at e4 that the total adjusted expected volume within the sliding window e-4:e-2 to e4 is only 9 vehicles and, therefore, also does not satisfy the EXPECTED_THRESH requirement. At epoch 5, however, the system would determine that the total adjusted expected value across the relative epochs e5:e-2 to e4 is 10 vehicles and as such is greater than or equal to the EXPECTED_THRESH requirement. Therefore, the system 100 store the corresponding data in memory.

In one instance, for the entire duration of the anomaly detection, the system 100 functions the same for a probe anomaly detected immediately over the most recent epoch (FIG. 3) and for a probe anomaly detected over a sliding window of epochs (FIG. 4). For example, in one embodiment, the system 100 checks if any older epochs can be removed from the dynamic window before storing the relative values in memory. In this instance, the system 100 can determine at epoch 8 that the dynamic window need not include the volume data from e8:e-2 to maintain the required total adjusted expected vehicles. Thus, the system 100 does not include the value 2 corresponding to e8:e-2 in the dynamic window e8:e-1 to e7.

In one embodiment, when the probe anomaly has expired (e.g., starting at e10), it can take the system 100 some time to detect the change, as it measures an anomaly over a window of epochs (e.g., 6 epochs). To be specific, if the system 100 measures the probe anomaly over 6 epoch as in this example, when the anomaly expires, the system 100 will detect that the most recent epoch (e.g., e10) has an actual volume matching the expected volume (e.g., 2). However, this total volume is summed together with the previous 5 epochs (e.g., e10:e5 to e9), which occurred during the anomaly and, therefore, have already been adjusted by the system 100. Thus, the system 100 will not sense full recovery at the current epoch (e10) and, therefore, adjusts the expected volume for the current epoch (e10:e10) as described below with respect to the recovery expected volume values. The same is true between e11) and e14 as indicated by the values within the box 405. Specifically, it is not until the system 100 reaches e15 that the dynamic window satisfies the requirement EXPECTED_THRESH (10) without requiring any adjusted expected volume values.

In one embodiment, the system 100 calculates the recovery expected volume values by first determining the total expected volume over the sliding window of epochs (e.g. 6) at the epoch at which the anomaly expires (e.g., e10). In this example, at epoch 10, the anomaly detection window spans over e5-e10, where the actual volumes for epochs e5-e9 have been halved and at the current epoch e10, the system 100 detects that the actual volume and the expected volume are the same. Thus, within the window of e5-e10, the system 100 determines that the total expected volume is 1+2+1+4+4+2=14 (e0:e5 to e10; box 407). In contrast, the total actual observed volume is 0.5+1+0.5+2+2+2=8 (e.g., based on a 50% constant drop). In other words, the system 100 expected 14 vehicles and observed 8 vehicles in real-time. In one embodiment, the system 100 therefore adjusts the expected volume at e10 as follows: 2*8/14=1.143 (e10:e10), where 2 was the original expected volume at e10. It should be noted that like the pre-recovery period, the expected volumes for e5-e9 are not re-adjusted as they have already been adjusted by the system 100 in previous steps.

By way of another example, the system 100 can determine that at e11, the total expected volume is 2+1+4+4+2+2=15 (e0:e6 to e11; box 409). In contrast, the total actual observed volume is 1+0.5+2+2+2+2=9.5 (e.g., based on a 50% constant drop for e6 to e9 and the expected volumes for e11) and e11). Hence, the system 100 adjusts the expected volume at e11 as follows: 2*9.5/15=1.267, where 2 was the original expected volume at e11. In this instance, the system 100 continues this process with the same logic until e15, where no expected volume modifications are required, as depicted by the darker font of e15:e15 relative to e:15:e14. More specifically, the system 100 can determine that the dynamic window can satisfy the EXPECTED_THRESH (10) requirement without including any adjusted volumes (e.g., 1.143+ 1.267+2.9+3.2+1.1778=10.288). Thereafter, in one embodiment, if the system 100 observes much lower actual volumes in real-time than the expected volumes, the system 100 can mark the road as a potential road closure (e.g., with a relative high degree of certainty).

In one instance, the system 100 can detect full recovery whenever the total number of real-time vehicles 101 over the sliding window equals or exceeds the total expected volume within that window. In one embodiment, if the ratio of [actual volume]/[expected volume] exceeds a given threshold (e.g., 0.95), then the system 100 can assume that the anomaly has expired.

In one embodiment, to avoid and/or minimize the chance of inactive windows, the system 100 can also keep a history of epochs longer than the dynamic window in memory (e.g., in the probe data layer 119 and/or the geographic database 121). For instance, the system 100 can store a set of dynamic memory epochs plus 10 epochs, or a multiple of the dynamic window (e.g., 1.5 times the dynamic window).

Figure 5:
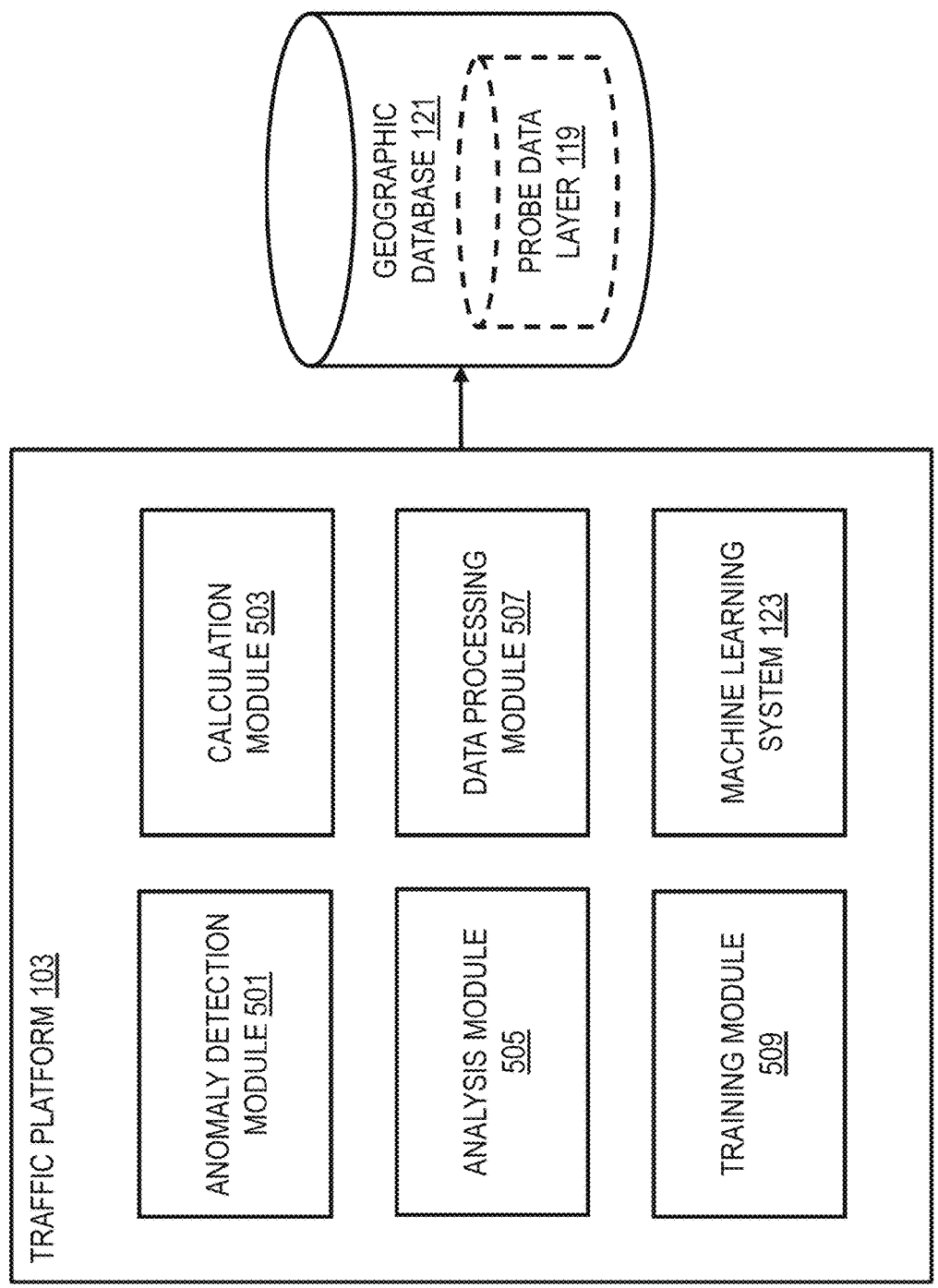
FIG. 5 is a diagram of the components of a traffic platform configured to automatically detect road closures during a probe anomaly, according to one embodiment.

FIG. 5 is a diagram of the components of the traffic platform 103, according to one embodiment. By way of example, the traffic platform 103 includes one or more components for automatically detecting a road closure during a probe anomaly, according to the various embodiments described herein. It is contemplated that the functions of these components may be combined or performed by other components of equivalent functionality. In one embodiment, the traffic platform 103 includes an anomaly detection module 501, a calculation module 503, an analysis module 505, a data processing module 507, a training module 509, and the machine learning system 123, and has connectivity to the geographic database 121 including the probe data layer 119. The above presented modules and components of the traffic platform 103 can be implemented in hardware, firmware, software, or a combination thereof. Though depicted as a separate entity in FIG. 1, it is contemplated that the traffic platform 103 may be implemented as a module of any other component of the system 100. In another embodiment, the traffic platform 103 and/or the modules 501-509 may be implemented as a cloud-based service, local service, native application, or combination thereof. The functions of the traffic platform 103, the machine learning system 123, and/or the modules 501-509 are discussed with respect to FIG. 6.

Figure 6:
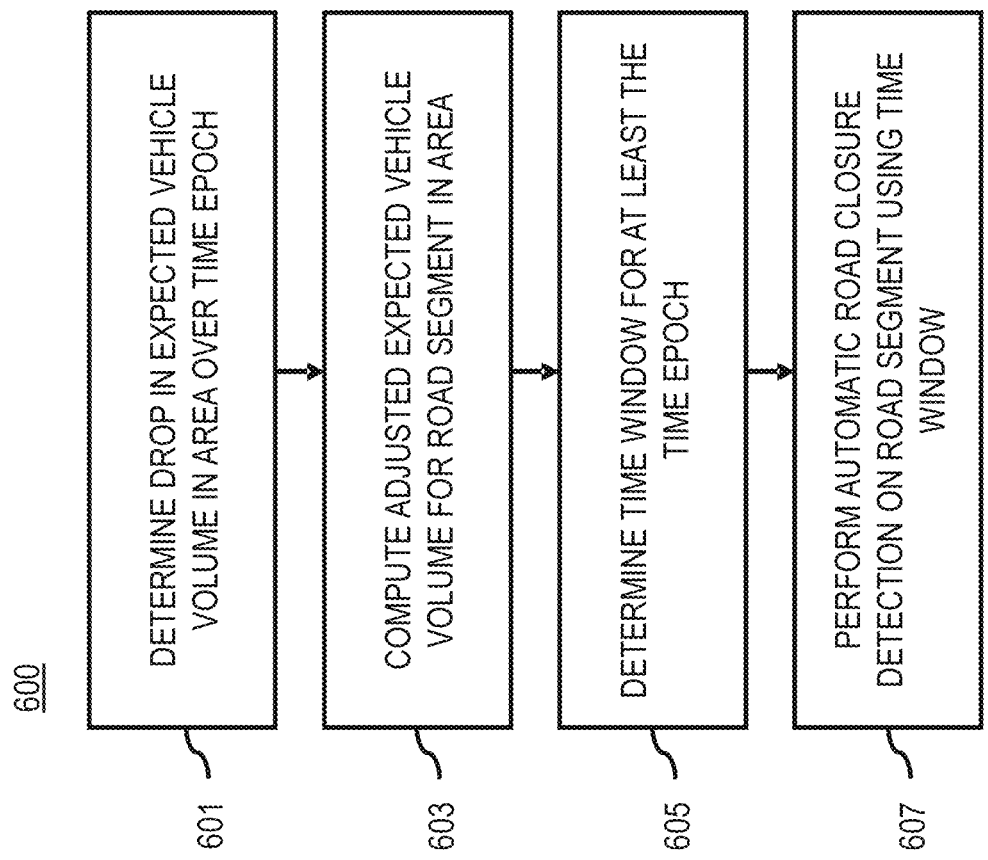
FIG. 6 is a flowchart of a process for automatically detecting road closures during a probe anomaly, according to one embodiment.
Figure 10:
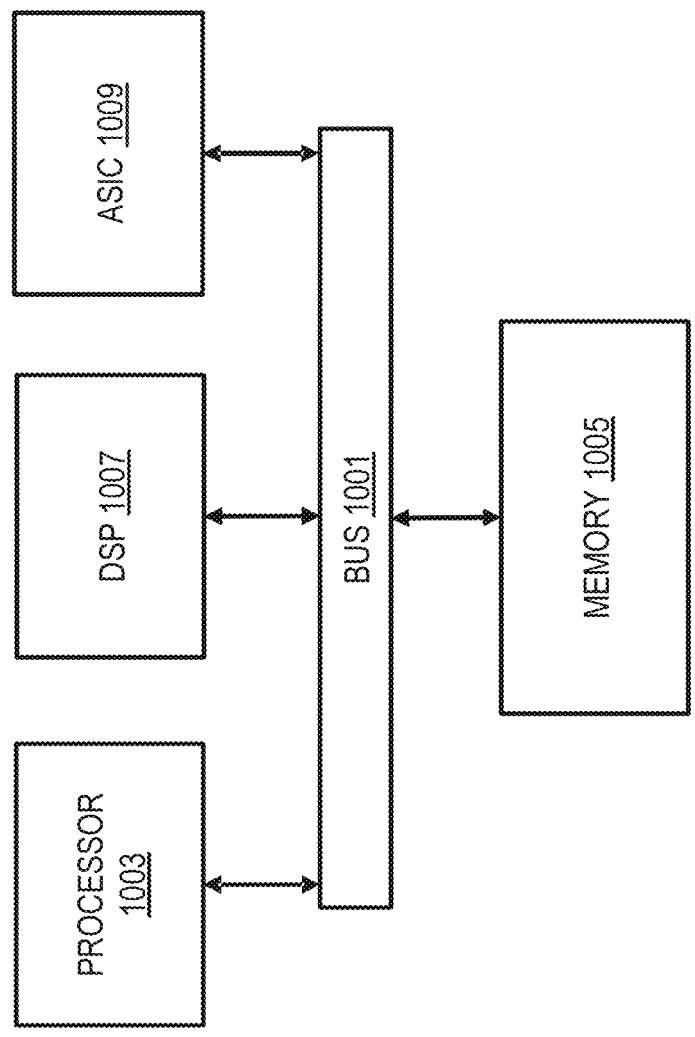
FIG. 10 is a diagram of a chip set that can be used to implement an embodiment.

FIG. 6 is a flowchart of a process for automatically detecting road closures during a probe anomaly, according to one embodiment. In various embodiments, the traffic platform 103, the machine learning system 123, and/or any of the modules 501-509 may perform one or more portions of the process 500 and may be implemented in, for instance, a chip set including a processor and a memory as shown in FIG. 10. As such, the traffic platform 103, the machine learning system 123, and/or the modules 501-509 can provide means for accomplishing various parts of the process 600, as well as means for accomplishing embodiments of other processes described herein in conjunction with other components of the system 100. Although the process 600 is illustrated and described as a sequence of steps, its contemplated that various embodiments of the process 600 may be performed in any order or combination and need not include all the illustrated steps.

In step 601, the anomaly detection module 501 determines a drop in an expected vehicle volume in a geographic area over a time epoch, wherein the expected vehicle volume represents an expected number of unique vehicles traveling in the geographic area over the time epoch. In one embodiment, the unique vehicles (e.g., vehicles 101) traveling in the geographic area generate probe data (e.g., via the vehicle sensors 103 and/or UEs 109) for the performing of the automatic road closure detection. In one instance, the anomaly detection module 501 determines the drop or anomaly in the expected vehicle volume based on the unexpected drop in the probe data received from the vehicles 101 and/or the UEs 109.

In one embodiment, the time epoch comprises the current time epoch or the time epochs within a designated time window of the current time (i.e., the time epoch of interest). By way of example, a time epoch may comprise 5-minute segments of a day, 1-hour segments of a day, etc. In other words, a time epoch can be used to segment a period of time (e.g., a day) by discrete time windows. For example, a segmentation of a 24-hour period in 5-minute time epochs would result in a total of 288 individual time epochs.

In step 603, the calculation module 503 computes an adjusted expected vehicle volume for a road segment in the geographic area based on the drop and a historical expected vehicle volume for the road segment over the time epoch. In one embodiment, the calculation module 503 computes the adjusted expected vehicle volume such that a drop of 50% in actual vehicle volume results in a 50% adjustment in expected vehicle volume.

In one embodiment, the calculation module 503 initiates the computing of the adjusted expected vehicle based on the analysis module 505 comparing the drop (e.g., in vehicle volume) against one or more threshold values. By way of example, the one or more threshold values may comprise a percentage (e.g., <85%) representing the total number real-time vehicles over the total expected volume.

In one embodiment, the calculation module 503 computes the adjusted expected vehicle volumes based on over how many epochs the probe anomaly is detected by the anomaly detection module 501. The simplest case is that the anomaly detection module 501 detects the anomaly immediately. In that case, in one embodiment, the calculation module 503 only computes the adjusted expected vehicle volume for the current epoch. The more general case is that the anomaly detection module 501 detects a probe anomaly over multiple epochs (e.g., 5 epochs). In that case, the calculation module 503 computers the adjusted expected vehicle volume for those 5 epochs onwards. This includes the 4 most recent epochs as well as the current epoch.

In one embodiment, the historical expected vehicle volume may be stored in and/or accessed by the data processing module 503 via the probe data layer 119 and/or the geographic database 121. By way of example, the historical expected vehicle volume data may comprise individual statistics such as unique historical vehicles 101 for each road segment in each of the time epochs, summary statistics (e.g., mean, median, etc.), or a combination thereof. In one instance, the historical expected vehicle volumes may include contextual and/or temporal data such as the day of the week, the time of day, the weather, the road conditions, etc.

In step 605, the data processing module 507 determines a time window comprising at least the time epoch (e.g., the current epoch and/or the given time period). In one embodiment, the time window comprises a past window (e.g., past 5 minutes, past 1 hour, past 5 hours, etc.) including the current time or the current epoch. By way of example, it is contemplated that the calculation module 505 determines the time window such that it covers a long enough time period that where a significant volume of vehicles are expected on the monitored road segment such that if the actual volume is low, the analysis module 505 can flag the difference between expected and actual volumes as a sign of road closure.

In one instance, the data processing module 507 determines the time window based on the following conditions: (1) the total expected vehicle volume of all epochs the time window spans across, must be greater or equal to a threshold volume, called EXPECTED_THRESH; (2) the time window shall have a minimum size, called MIN WINDOW SIZE; and (3) the time window shall have a maximum size, called MAX WINDOW SIZE.

In one embodiment, the calculation module 503 determines the number of time epochs (e.g., past epochs) included in the time window by recursively adding each time epoch until a total expected vehicle volume of said each time epoch meets a threshold expected vehicle volume. By way of example, the threshold expected vehicle volume may be the threshold volume called EXPECTED_THRESH. In one instance, the threshold expected vehicle volume may be the volume of vehicles required for the analysis module 505 to determine a meaningful difference between the expected and actual volumes such that that difference is indicative of a road closure. In one embodiment, depending on the expected volume of each epoch, the calculation module 503 can determine that one or more of the oldest epochs are no longer required in the window while satisfying the conditions 1-2 above. In that case, the data processing module 507 can clean the oldest epochs of the time window while still satisfying the time window requirements.

In one instance, the time window is a dynamic time window that the data processing module 507 expands or contracts based on the adjusted expected vehicle volume. By way of example, the data processing module 507 expands the time window during the anomaly and contracts and returns the time window to its pre-anomaly size once the anomaly detection module 501 determines that the anomaly has expired.

In one embodiment, wherein the time window includes the time epoch (e.g., the current epoch) and at least one other time epoch (e.g., a sliding window of epochs), the calculation module 503 applies the drop to adjust the historical expected vehicle volume on the road segment for all time epochs in the time window. By way of example, at the time the anomaly detection module 501 communicates to the calculation module 503 that an anomaly is happening, the calculation module 503 assumes that the anomaly has been occurring for the entire duration of the anomaly detection sliding window. Therefore, when the anomaly is detected at the current epoch, the calculation module 503 not only adjusts the historic expected vehicle volume at the current epoch, but also the volumes of the previous epochs within the sliding window. In one embodiment, the calculation module 503 adjusts the historical expected vehicle volume in the time window over a same number of time epochs that was used to detect the drop. For instance, an example of this occurs at epoch 3 in FIG. 4.

In one instance, wherein the drop spans the time epoch and at least one other time epoch included in the time window (e.g., a sliding window of epochs), the calculation module 503 computes at least one other adjusted expected vehicle volume for the road segment over the at least one other time epoch. By way of example, the one other adjusted expected vehicle volume may be the adjusted vehicle volume of the current epoch during the recovery period. In one embodiment, the analysis module 505 detects a recovery from the drop based on determining that a total expected vehicle volume for the time window equals or exceeds a threshold expected volume (e.g., 95%). However, since the anomaly detection module 501 detects the anomaly over a sliding window of epochs (e.g., 6 epochs), it does not detect the recovery immediately. Therefore, in one embodiment, the calculation module 503 computes the other adjusted expected vehicle volume based on the original expected volume multiplied by the total actual observed divided by the total expected volume.

In step 607, the data processing module 507 and/or the machine learning system 123, perform an automatic road closure detection on the road segment using the time window. In one instance, the dynamic width of the time window enables the data processing module 507 to look at a large enough time period such that the difference between expected and actual volume can be highlighted in the case of reduced actual volumes. In one embodiment, the data processing module 507 marks the road segment and other road segments in the geographic area as being affected by the drop (e.g., road closed).

In one embodiment, the machine learning system 123 can automatically detect a road closure on a road segment during a probe anomaly. In one instance, the training module 509 can train or condition the machine learning system 123 using a set of features or inputs (e.g., stored in and/or accessible via the probe data layer 119 and/or the geographic database 121) that indicate an anomaly with a monitored road. By way of example, the generated features may include, but are not limited to, historically expected volumes as well as real-time actual observed volumes on road segments as described with respect to the steps above. In one embodiment, once the time window meets the threshold expected vehicle volume, the calculation module 503 calculates the features for training and use with the machine learning system 123. By way of example, in the scenario of the outage detected immediately over the most recent epoch, when calculating the machine learning features, the calculation module 503 adjusts (reduces) the expected vehicle volume by the anomaly rate. By way of example, the training module 509 can train the machine learning system 123 to identify road closures by assigning weights, correlations, relationships, etc. among the features corresponding to actual and expected vehicle volumes on a road segment. In one embodiment, the training module 409 can continuously provide and/or update a machine learning module (e.g., a support vector machine (SVM), neural network, decision tree, etc.) of the machine learning system 123 during training using, for instance, supervised deep convolution networks or equivalents. In other words, the training module 409 trains a machine learning model using the various features to enable the machine learning system 123 to automatically detect a road closure during a probe anomaly.

In one embodiment, the data processing module 507 inactivates the time window for the automatic closure detection based on the analysis module 505 determining that the adjusted expected volume for the road segment results in a total expected vehicle volume for the time window being below a threshold expected volume (e.g., less than EXPECTED_THRESH). In one instance, the system 100 only keeps the date for the current epoch and the epochs contained in the time window in memory (e.g., the probe data layer 119 and/or the geographic database 121). When the data processing module 507 reduces the expected vehicle volumes (e.g., based on the drop), there is a chance that the new total volume of the time window will not satisfy the condition of greater than or equal to the threshold number of vehicles (e.g., EXPECTED_THRESH). Thus, in this instance, the data processing module 507 inactivates the time window. In embodiment, to avoid or minimize the chance of inactive windows, the data processing module 507 stores or causes the storage (e.g., in the geographic database 121) of a history of time epochs longer than the time window. Likewise, in one instance, the calculation module 503 can expand the time window further back in the history of time epochs to avoid inactivating of the time window.

Figure 7A:
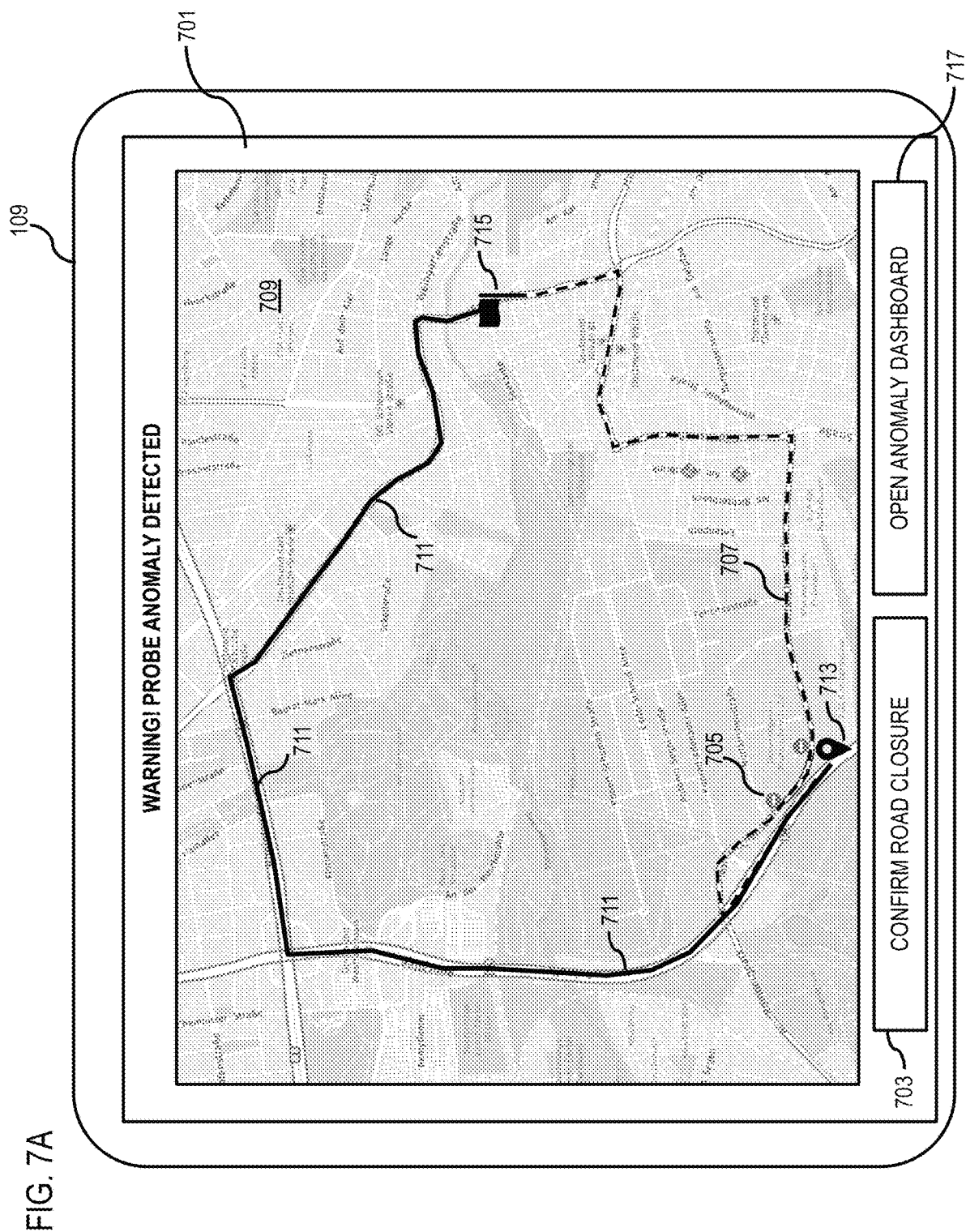
FIGS. 7A-7B are diagrams of example user interfaces capable of automatically detecting a road closure during a probe anomaly, according to one embodiment.
Figure 7B:
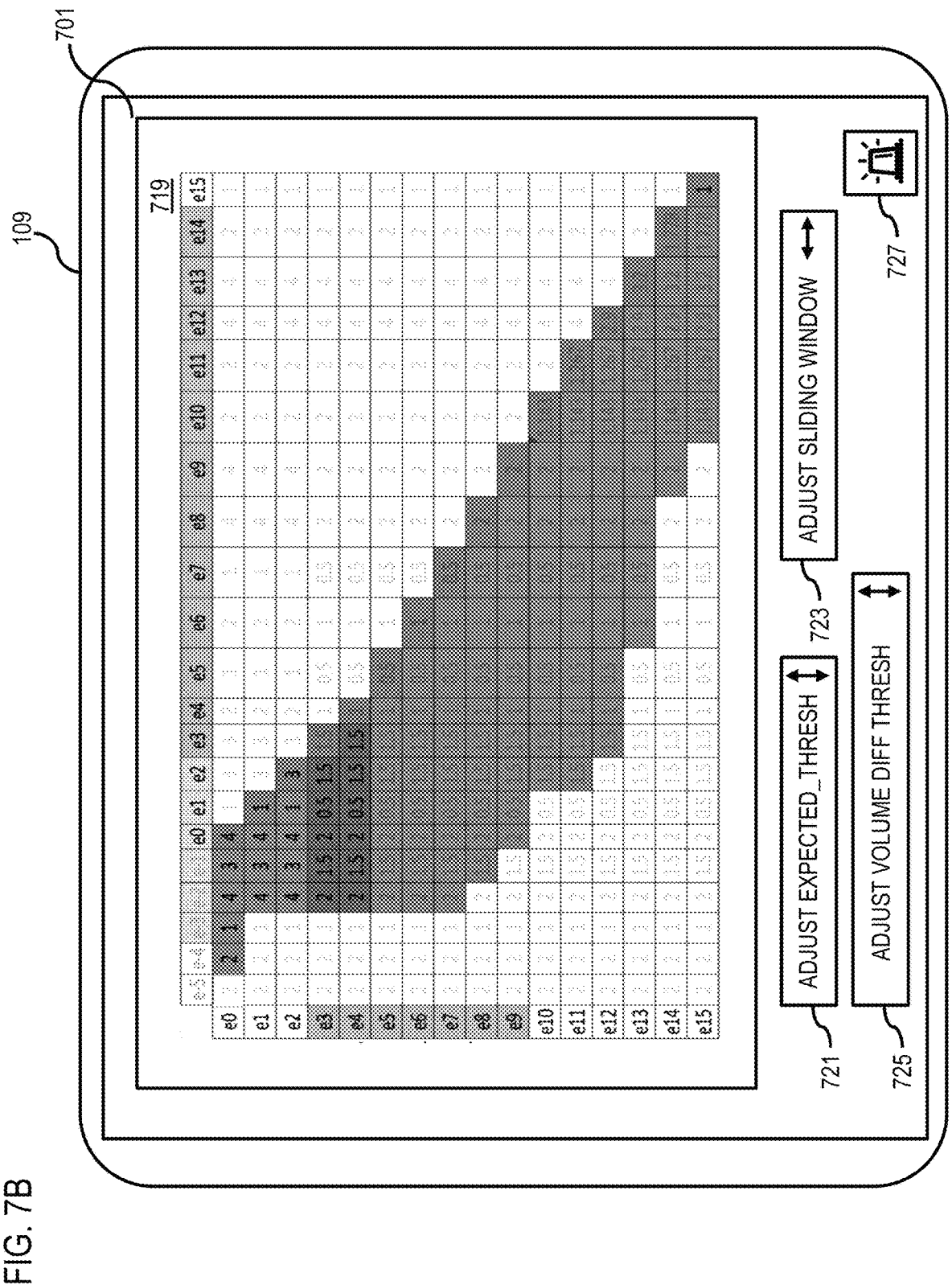

FIGS. 7A-7B are diagrams of example user interfaces capable of automatically detecting a road closure during a probe anomaly, according to one embodiment. In this example, a UI 701 (e.g., a navigation application 111) is generated for a UE 109 (e.g., a mobile device, an embedded navigation system, a client terminal, etc.) that includes an input 703 that enables a user (e.g., a software developer) to confirm a road closure 705 on a road segment of interest 707 within a road representation (e.g., a digital map 709) of a monitored geographic area (e.g., a city) during a probe anomaly (e.g., "Warning Probe Anomaly Detected").

In this example, the system 100 has generated a navigation route 711 between a starting point 713 and a desired destination 715. In one embodiment, the road segments 707 and 711 are graphically represented on the digital map 709 as being open (e.g., route 711), closed (e.g., route 707), congested, or a combination thereof. However, as described above, if the system 100 was unaware of the probe anomaly at the time the route 711 was calculated, then the system 100 may have calculated the route 711 erroneously. For example, but for the road closure 705 of route 707, a vehicle 101 could reach the destination 715 much faster by traveling route 707 compared to route 711 (at least in terms of required distance of travel). Thus, the user may want to visually inspect the traits or features of the detection process to help validate the automatic detection of the road closure 705 during the probe anomaly.

In one embodiment, the system 100 can generate the UI 701 such that it includes an input 717 that enables a user (e.g., a software engineer) to transition (or toggle) between the road representation 709 and a visual dashboard 719 (e.g., the adjusted expected volumes over time), as depicted in FIG. 7B. In one instance, the system 100 can generate the UI 701 such that it includes (1) an input 721 to enable a user to adjust the value that the total expected vehicle volume of all the epochs the dynamic window spans across must be greater than or equal to (i.e., EXPECTED_THRESH); (2) an input 723 to enable a user to adjust the size of the sliding window of epochs; and (3) an input 725 to enable a user to adjust the requisite difference between expected and actual unique vehicle volumes that is used by the system 100 in one instance to determine the start, duration, and/or expiration of a probe anomaly so that the user may visualize and/or appreciate the traits and features of the automatic road closure detection process in "motion." It is contemplated that by viewing the different inferences reached by the system 100 through manipulations of the various thresholds and windows, a user can have a better understanding of the traits and features of the detection process and the system 100 and/or machine learning system 123 can derive better metrics for automatically detecting road closures during a probe anomaly and/or scoring such detections against some sort of ground truth (e.g., a human verified closure).

In one instance, the system 100 can generate the UI 701 such that it includes an input 727 to enable a user (e.g., a software developer) to flag a road or route (e.g., route 705) for further evaluation and/or verification (e.g., manual confirmation). In one embodiment, a user can interact with the inputs 703, 717, 721, 723, 725, and 727 via one or more physical interactions (e.g., a touch, a tap, a gesture, typing, etc.), one or more voice commands (e.g., "confirm road closure," "increase expected threshold," "flag road closure," etc.), or a combination thereof. By way of example, a user may also be a driver or a passenger of a vehicle 101 (e.g., an autonomous or semi-autonomous vehicle) and she or he may want to confirm that the routing or guidance determined by the system 100 including road closures is accurate and/or up-to-date to feel more comfortable about her or his journey. This is particularly true in the case of a user that is a passenger in an autonomous vehicle. It is contemplated that in this instance, the system 100 can determine or detect one or more actions by a user (e.g., a rapid increase heart rate, rapid eye movement, etc.) and, therefore, automatically initiate the confirmation of the road closure process during the detection of a probe anomaly in an attempt to comfort the user in response to the one or more detected user actions.

Returning to FIG. 1, in one embodiment, the traffic platform 103 performs the process for automatically detecting a road closure during a probe anomaly as discussed with respect to the various embodiments described herein. For example, the traffic platform 103 can generate adjusted historical expected vehicle volume features over a past window for machine learning algorithm solutions.

In one embodiment, the machine learning system 123 of the traffic platform 103 includes a neural network or other machine learning system to compare (e.g., iteratively) adjusted (reduced) historically expected vehicle volumes and real-time actual observed volumes on road segments. For example, when the inputs are features/flags indicating a road segment in the geographic area as being affected by the probe anomaly, the output can include an identification or a suggestion that the drop is caused by or indicative of a road closure. In one embodiment, the neural network of the machine learning system 123 is a traditional convolutional neural network which consists of multiple layers of collections of one or more neurons (which are configured to process a portion of an input data). In one embodiment, the machine learning system 123 also has connectivity or access over the communication network 107 to the probe data layer 119 and/or the geographic database 121 that can each store probe data, labeled or marked features (e.g., historically expected volumes and/or real-time actual observed volumes on road segments), etc.

In one embodiment, the traffic platform 103 has connectivity over the communications network 107 to the services platform 113 (e.g., an OEM platform) that provides the services 115a-115n (also collectively referred to herein as services 115) (e.g., probe and/or sensor data collection services). By way of example, the services 115 may also be other third-party services and include mapping services, navigation services, traffic incident services, travel planning services, notification services, social networking services, content (e.g., audio, video, images, etc.) provisioning services, application services, storage services, contextual information determination services, location-based services, information-based services (e.g., weather, news, etc.), etc. In one embodiment, the services platform 113 uses the output (e.g. closed road segments) of the traffic platform 103 to provide services such as navigation, mapping, other location-based services, etc.

In one embodiment, the traffic platform 103 may be a platform with multiple interconnected components. The traffic platform 103 may include multiple servers, intelligent networking devices, computing devices, components and corresponding software for providing parametric representations of lane lines. In addition, it is noted that the traffic platform 103 may be a separate entity of the system 100, a part of the services platform 113, a part of the one or more services 115, or included within a vehicle 101 (e.g., an embedded navigation system).

In one embodiment, content providers 117 may provide content or data (e.g., including probe data, unique vehicle volume data, etc.) to the traffic platform 103, the UEs 109, the applications 111, the services platform 113, the services 115, the probe data layer 119, the geographic database 121, and the vehicles 101. The content provided may be any type of content, such as map content, textual content, audio content, video content, image content, etc. In one embodiment, the content providers 117 may provide content regarding the expected frequency of vehicles 101 on the digital map or link as well as content that may aid in localizing a vehicle path or trajectory on a digital map or link (e.g., to assist with determining actual vehicle volumes on a road network). In one embodiment, the content providers 117 may also store content associated with the traffic platform 103, the services platform 113, the services 115, the probe data layer 119, the geographic database 121, and/or the vehicles 101. In another embodiment, the content providers 117 may manage access to a central repository of data, and offer a consistent, standard interface to data, such as a repository of the probe data layer 119 and/or the geographic database 121.

By way of example, the UEs 109 are any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that a UE 109 can support any type of interface to the user (such as "wearable" circuitry, etc.). In one embodiment, a UE 109 may be associated with a vehicle 101 (e.g., a mobile device) or be a component part of the vehicle 101 (e.g., an embedded navigation system). In one embodiment, the UEs 109 may include the traffic platform 103 to automatically detect a road closure during a probe anomaly.

In one embodiment, as mentioned above, the vehicles 101, for instance, are part of a probe-based system for collecting probe data for detecting actual and expected vehicle volumes on a road network and/or measuring traffic conditions in a road network (e.g., free flow traffic versus a road closure). In one embodiment, each vehicle 101 is configured to report probe data as probe points, which are individual data records collected at a point in time that records telemetry data for that point in time. In one embodiment, the probe ID can be permanent or valid for a certain period of time. In one embodiment, the probe ID is cycled, particularly for consumer-sourced data, to protect the privacy of the source.

In one embodiment, a probe point can include attributes such as: (1) probe ID, (2) longitude, (3) latitude, (4) heading, (5) speed, and (6) time. The list of attributes is provided by way of illustration and not limitation. Accordingly, it is contemplated that any combination of these attributes or other attributes may be recorded as a probe point. For example, attributes such as altitude (e.g., for flight capable vehicles or for tracking non-flight vehicles in the altitude domain), tilt, steering angle, wiper activation, etc. can be included and reported for a probe point. In one embodiment, the vehicles 101 may include sensors 105 for reporting measuring and/or reporting attributes. The attributes can also be any attribute normally collected by an on-board diagnostic (OBD) system of the vehicle 101, and available through an interface to the OBD system (e.g., OBD II interface or other similar interface).

The probe points can be reported from the vehicles 101 in real-time, in batches, continuously, or at any other frequency requested by the system 100 over, for instance, the communication network 107 for processing by the traffic platform 103. The probe points also can be map matched to specific road links stored in the geographic database 121. In one embodiment, the system 100 (e.g., via the traffic platform 103) can generate probe traces (e.g., vehicle paths or trajectories) from the observed and expected frequency of probe points for an individual probe so that the probe traces represent a travel trajectory or vehicle path of the probe through the road network.

In one embodiment, as previously stated, the vehicles 101 are configured with various sensors (e.g., vehicle sensors 105) for generating or collecting probe data, sensor data, related geographic/map data, etc. In one embodiment, the sensed data represents sensor data associated with a geographic location or coordinates at which the sensor data was collected. In one embodiment, the probe data (e.g., stored in the probe data layer 119) includes location probes collected by one or more vehicle sensors 105. By way of example, the vehicle sensors 105 may include a RADAR system, a LiDAR system, global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of vehicle manned or unmanned (e.g., cars, trucks, buses, vans, motorcycles, scooters, drones, etc.) that travels through road segments of a road network.

Other examples of sensors 105 of a vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of a vehicle 101 along a path of travel, moisture sensors, pressure sensors, etc. In a further example embodiment, sensors 105 about the perimeter of a vehicle 101 may detect the relative distance of the vehicle 101 from a physical divider, a lane line of a link or roadway, the presence of other vehicles, pedestrians, traffic lights, potholes and any other objects, or a combination thereof. In one scenario, the vehicle sensors 105 may detect weather data, traffic information, or a combination thereof. In one embodiment, a vehicle 101 may include GPS or other satellite-based receivers 105 to obtain geographic coordinates from satellites 125 for determining current location and time. Further, the location can be determined by visual odometry, triangulation systems such as A-GPS, Cell of Origin, or other location extrapolation technologies.

In one embodiment, the UEs 109 may also be configured with various sensors (not shown for illustrative convenience) for acquiring and/or generating probe data and/or sensor data associated with a vehicle 101, a driver, a passenger, other vehicles, conditions regarding the driving environment or roadway, etc. For example, such sensors may be used as GPS receivers for interacting with the one or more satellites 125 to determine and track the current speed, position and location of a vehicle 101 travelling along a link or road segment. In addition, the sensors may gather tilt data (e.g., a degree of incline or decline of the vehicle during travel), motion data, light data, sound data, image data, weather data, temporal data and other data associated with the vehicles 101 and/or UEs 109. Still further, the sensors may detect local or transient network and/or wireless signals, such as those transmitted by nearby devices during navigation of a vehicle along a roadway (Li-Fi, near field communication (NFC)) etc.

It is noted therefore that the above described data may be transmitted via the communication network 107 as probe data (e.g., GPS probe data) according to any known wireless communication protocols. For example, each UE 109, application 111, user, and/or vehicle 101 may be assigned a unique probe identifier (probe ID) for use in reporting or transmitting said probe data collected by the vehicles 101 and/or UEs 109. In one embodiment, each vehicle 101 and/or UE 109 is configured to report probe data as probe points, which are individual data records collected at a point in time that records telemetry data.

In one embodiment, the traffic platform 103 retrieves aggregated probe points gathered and/or generated by the vehicle sensors 105 and/or the UEs 109 resulting from the travel of the UEs 109 and/or vehicles 101 on a road segment of a road network. In one instance, the probe data layer 119 stores a plurality of probe points and/or trajectories generated by different vehicle sensors 105, UEs 109, applications 111, vehicles 101, etc. over a period while traveling in a large monitored area (e.g., a country, a city, etc.). A time sequence of probe points specifies a trajectory—i.e., a path traversed by a UE 109, application 111, vehicle 101, etc. over the period. In one instance, as the time between data points increases, so does the distance and the possible routes/paths between those two points.

In one embodiment, the communication network 107 of the system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, traffic platform 103, vehicle sensors 105, UEs 109, applications 111, services platform 113, services 115, content providers 117, and/or satellites 125 communicate with each other and other components of the system 100 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 8:
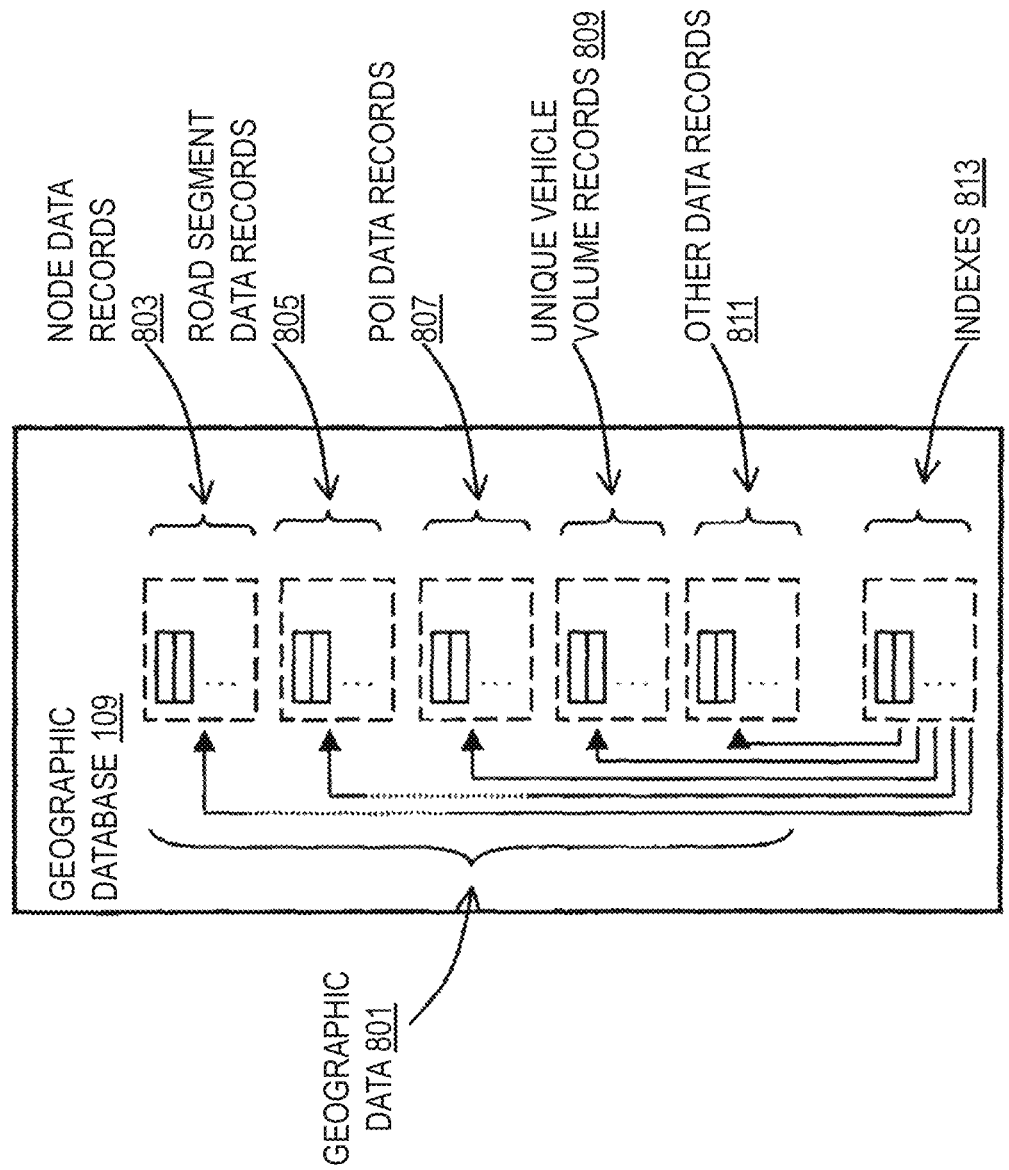
FIG. 8 is a diagram of a geographic database, according to one embodiment.

FIG. 8 is a diagram of a geographic database, according to one embodiment. In one embodiment, the geographic database 121 includes geographic data 801 used for (or configured to be compiled to be used for) mapping and/or navigation-related services. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 121.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 121 follows certain conventions. For example, links do not cross themselves and do not cross each other except at a node. Also, there are no duplicated shape points, nodes, or links. Two links that connect each other have a common node. In the geographic database 121, overlapping geographic features are represented by overlapping polygons. When polygons overlap, the boundary of one polygon crosses the boundary of the other polygon. In the geographic database 121, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 121 includes node data records 803, road segment or link data records 805, Point of Interest (POI) data records 807, unique vehicle volume records 809, other records 811, and indexes 813, for example. More, fewer or different data records can be provided. In one embodiment, additional data records (not shown) can include cartographic ("carto") data records, routing data, and maneuver data. In one embodiment, the indexes 813 may improve the speed of data retrieval operations in the geographic database 121. In one embodiment, the indexes 813 may be used to quickly locate data without having to search every row in the geographic database 121 every time it is accessed. For example, in one embodiment, the indexes 813 can be a spatial index of the polygon points associated with stored feature polygons.

In exemplary embodiments, the road segment data records 805 are links or segments representing roads, streets, or paths, as can be used in the calculated route or recorded route information for determination of one or more personalized routes. The node data records 803 are end points corresponding to the respective links or segments of the road segment data records 805. The road link data records 805 and the node data records 803 represent a road network, such as used by vehicles, cars, and/or other entities. Alternatively, the geographic database 121 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 121 can include data about the POIs and their respective locations in the POI data records 807. The geographic database 121 can also include data about places, such as cities, towns, or other communities, and other geographic features, such as bodies of water, mountain ranges, etc. Such place or feature data can be part of the POI data records 807 or can be associated with POIs or POI data records 807 (such as a data point used for displaying or representing a position of a city).

In one embodiment, the geographic database 121 includes the unique vehicle volume records 809 for current and historical probe data, time window data, road closure detections, road closure reports, road closure evaluations, road closure link graphs, associated vehicle paths, extracted features derived from probe data, sensor data, and/or any other related data. The unique vehicle volume records 809 include a probe data layer 119 that stores the road closure detections generated according to the various embodiments described herein. The probe data layer 119 can be provided to other system components or end users to provide related mapping, navigation, and/or other location-based services. In one embodiment, the unique vehicle volume records 809 can be associated with segments of a road link (as opposed to an entire link). It is noted that the segmentation of the road for the purposes of road closure detection can be different than the road link structure of the geographic database 121. In other words, the segments can further subdivide the links of the geographic database 121 into smaller segments (e.g., uniform lengths such as 5-meters). In this way, road closures or other traffic incidents can be predicted and represented at a level of granularity that is independent of the granularity or at which the actual road or road network is represented in the geographic database 121. In one embodiment, the unique vehicle volume records 809 can be associated with one or more of the node data records 803, road segment or link records 805, and/or POI data records 807; or portions thereof (e.g., smaller or different segments than indicated in the road segment records 805) to provide situational awareness to drivers and provide for safer autonomous operation of vehicles.

In one embodiment, the geographic database 121 can be maintained by the services platform 113 (e.g., a map developer). The map developer can collect geographic data to generate and enhance the geographic database 121. There can be different ways used by the map developer to collect data. These ways can include obtaining data from other sources, such as municipalities or respective geographic authorities. In addition, the map developer can employ field personnel to travel by vehicle along roads throughout the geographic region to observe features (e.g., road closures or other traffic incidents, etc.) and/or record information about them, for example. Also, remote sensing, such as aerial or satellite photography, can be used.

In one embodiment, the geographic database 121 include high resolution or high definition (HD) mapping data that provide centimeter-level or better accuracy of map features. For example, the geographic database 121 can be based on Light Detection and Ranging (LiDAR) or equivalent technology to collect billions of 3D points and model road surfaces and other map features down to the number lanes and their widths. In one embodiment, the HD mapping data capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, the geographic database 121 is stored as a hierarchical or multilevel tile-based projection or structure. More specifically, in one embodiment, the geographic database 121 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 121 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, a vehicle sensor 105 and/or a UE 109. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for automatically detecting a road closure during a probe anomaly may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
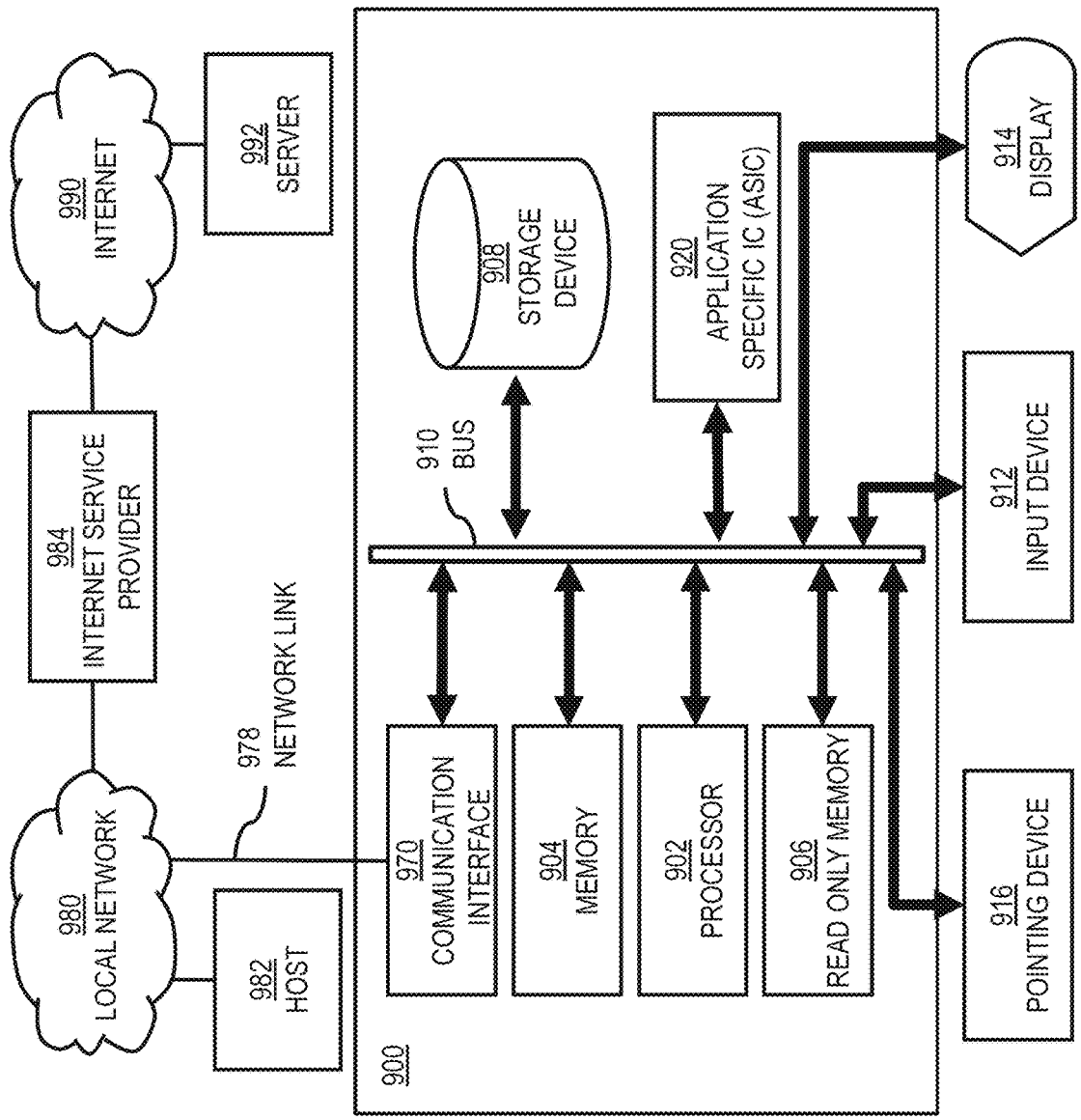
FIG. 9 is a diagram of hardware that can be used to implement an embodiment.

FIG. 9 illustrates a computer system 900 upon which an embodiment of the invention may be implemented. Computer system 900 is programmed (e.g., via computer program code or instructions) to automatically detect a road closure during a probe anomaly as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 910 includes one or more parallel conductors of information so that information is transferred quickly among devices coupled to the bus 910. One or more processors 902 for processing information are coupled with the bus 910.

A processor 902 performs a set of operations on information as specified by computer program code related to automatically detecting a road closure during a probe anomaly. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for automatically detecting a road closure during a probe anomaly. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for automatically detecting a road closure during a probe anomaly, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general, the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 107 for automatically detecting a road closure during a probe anomaly.

The term computer-readable medium is used herein to refer to any medium that participates in providing information to processor 902, including instructions for execution. Such a medium may take many forms, including, but not limited to, non-volatile media, volatile media and transmission media. Non-volatile media include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 10 illustrates a chip set 1000 upon which an embodiment of the invention may be implemented. Chip set 1000 is programmed to automatically detect a road closure during a probe anomaly as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to automatically detect a road closure during a probe anomaly. The memory 1005 also stores the data associated with or generated by the execution of the inventive steps.

Figure 11:
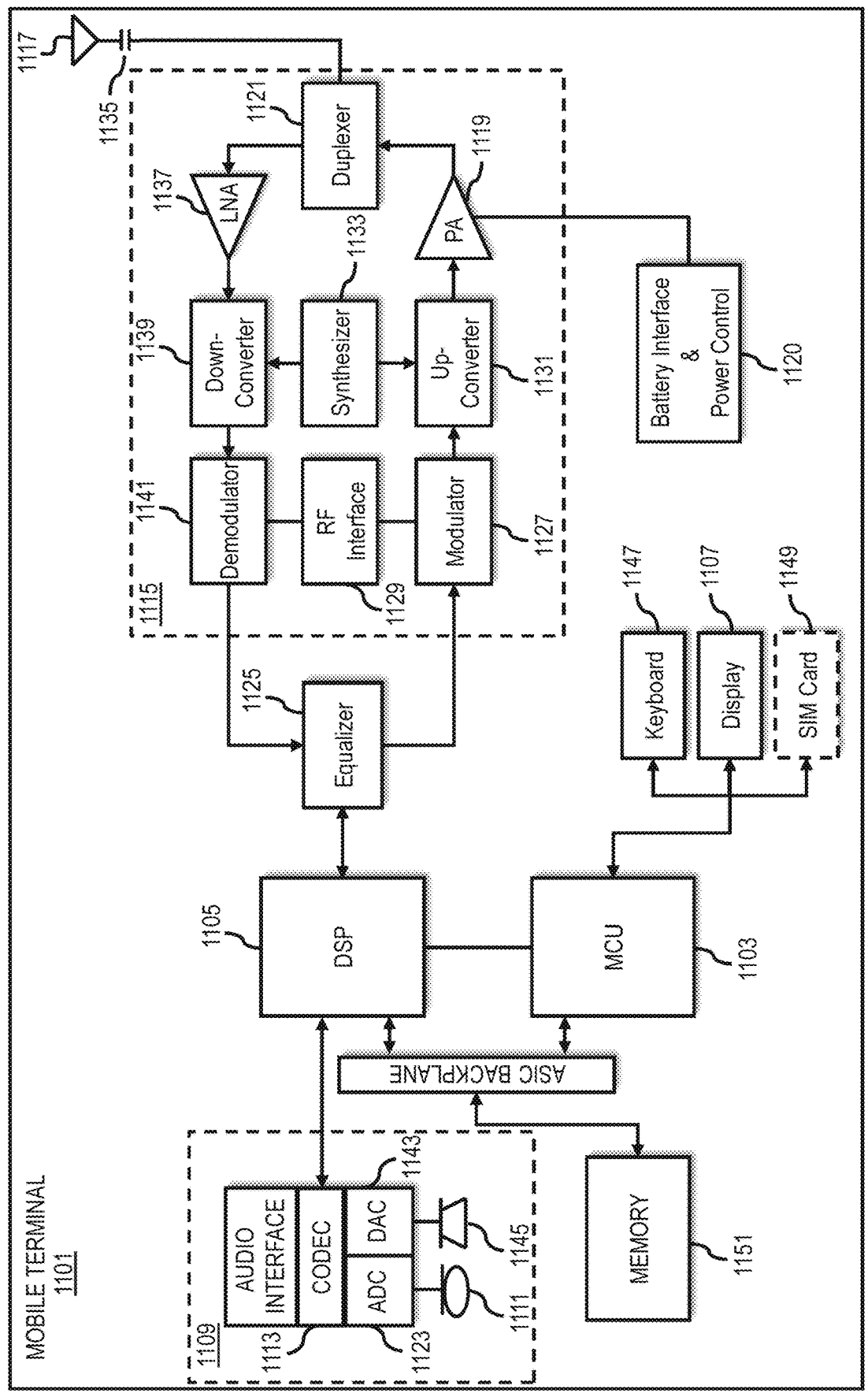
FIG. 11 is a diagram of a mobile terminal (e.g., handset or vehicle or part thereof) that can be used to implement an embodiment.

FIG. 11 is a diagram of exemplary components of a mobile terminal 1001 (e.g., a vehicle 101, a UE 109, or a component thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile station functions that offer automatic contact matching. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile station 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile station 1101 to automatically detect a road closure during a probe anomaly. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the station. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile station 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1151 may be, but not limited to, a single memory, CD, DVD, ROM, RAM, EEPROM, optical storage, or any other non-volatile or non-transitory storage medium capable of storing digital data.

An optionally incorporated SIM card 1149 carries, for instance, important information, such as the cellular phone number, the carrier supplying service, subscription details, and security information. The SIM card 1149 serves primarily to identify the mobile station 1101 on a radio network. The card 1149 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    determining a drop in an expected vehicle volume in a geographic area over a time epoch, wherein the expected vehicle volume represents an expected number of unique vehicles traveling in the geographic area over the time epoch, and wherein the unique vehicles traveling in the geographic area include sensors for capturing probe data for performing of an automatic road closure detection;
    computing an adjusted expected vehicle volume for a road segment in the geographic area based on the drop and a historical expected vehicle volume for the road segment over the time epoch;
    determining a time window comprising at least the time epoch;
    performing the automatic road closure detection on the road segment using the time window; and
    map matching, in real-time, the probe data with the road segment in a geographic database.

2. The method of claim 1, wherein the drop spans the time epoch and at least one other time epoch included in the time window, the method further comprising:
    computing at least one other adjusted expected vehicle volume for the road segment over the at least one other time epoch.

3. The method of claim 1, further comprising:
    determining a number of time epochs included in the time window by recursively adding each time epoch until a total expected vehicle volume of said each time epoch meets a threshold expected vehicle volume.

4. The method of claim 1, wherein the time window is a dynamic time window that expands or contracts based on the adjusted expected vehicle volume.

5. The method of claim 1, wherein the time window includes the time epoch and at least one other time epoch, the method further comprising:
    applying the drop to adjust the historical expected vehicle volume on the road segment for all time epochs in the time window.

6. The method of claim 1, further comprising:
    inactivating the time window for the automatic road closure detection based on determining that an adjusted expected volume for the road segment results in a total expected vehicle volume for the time window being below a threshold expected volume.

7. The method of claim 6, further comprising:
    storing a history of time epochs longer than the time window; and
    expanding the time window further back in the history of time epochs to avoid the inactivating of the time window.

8. The method of claim 1, further comprising:
    detecting a recovery from the drop based on determining that a total expected vehicle volume for the time window equals or exceeds a threshold expected volume.

9. The method of claim 1, further comprising:
    marking the road segment and other road segments in the geographic area as being affected by the drop.

10. The method of claim 1, further comprising:
    adjusting the historical expected vehicle volume in the time window over a same number of time epochs that was used to detect the drop.

11. The method of claim 1, further comprising:
    initiating computing of the adjusted expected vehicle based on comparing the drop against one or more threshold values.

12. An apparatus comprising:
    at least one processor; and
    at least one memory including computer program code for one or more programs,
    the at least one memory and the computer program code configured to, with the at least one processor, cause the apparatus to perform at least the following,
    determine a drop in an expected vehicle volume in a geographic area over a time epoch, wherein the expected vehicle volume represents an expected number of unique vehicles traveling in the geographic area over the time epoch, and wherein the unique vehicles traveling in the geographic area include sensors for capturing probe data for performing of an automatic road closure detection;
    compute an adjusted expected vehicle volume for a road segment in the geographic area based on the drop and a historical expected vehicle volume for the road segment over the time epoch;
    determine a time window comprising at least the time epoch;
    perform the automatic road closure detection on the road segment using the time window; and
    map match, in real-time, the probe data with the road segment in a geographic database.

13. The apparatus of claim 12, wherein the drop spans the time epoch and at least one other time epoch included in the time window, the apparatus is further caused to:

compute at least one other adjusted expected vehicle volume for the road segment over the at least one other time epoch.

14. The apparatus of claim 12, wherein the apparatus is further caused to:

determine a number of time epochs included in the time window by recursively adding each time epoch until a total expected vehicle volume of said each time epoch meets a threshold expected vehicle volume.

15. The apparatus of claim 12, wherein the time window is a dynamic time window that expands or contracts based on the adjusted expected vehicle volume.

16. The apparatus of claim 12, wherein the time window includes the time epoch and at least one other time epoch, the apparatus is further caused to:

apply the drop to adjust the historical expected vehicle volume on the road segment for all time epochs in the time window.

17. A non-transitory computer-readable storage medium, carrying one or more sequences of one or more instructions which, when executed by one or more processors, cause an apparatus to at least perform the following steps:

determining a drop in an expected vehicle volume in a geographic area over a time epoch, wherein the expected vehicle volume represents an expected number of unique vehicles generating probe data while traveling in the geographic area over the time epoch, and wherein the unique vehicles traveling in the geographic area include sensors for capturing probe data for performing of an automatic road closure detection;

computing an adjusted expected vehicle volume for a road segment in the geographic area based on the drop and a historical expected vehicle volume for the road segment over the time epoch;

determining a time window based on the probe data comprising at least the time epoch;

performing the automatic road closure detection on the road segment using the time window; and map matching, in real-time, the probe data with the road segment in a geographic database.

18. The non-transitory computer-readable storage medium of claim 17, wherein the drop spans the time epoch and at least one other time epoch included in the time window, the apparatus is further caused to perform:

computing at least one other adjusted expected vehicle volume for the road segment over the at least one other time epoch.

19. The non-transitory computer-readable storage medium of claim 17, wherein the apparatus is further caused to perform:

determining a number of time epochs included in the time window by recursively adding each time epoch until a total expected vehicle volume of said each time epoch meets a threshold expected vehicle volume.

\* \* \* \* \*